United States Patent
Ozaki et al.

(10) Patent No.: US 12,286,923 B2
(45) Date of Patent: *Apr. 29, 2025

(54) SUPERCOOLING CANCELLATION DEVICE, HEAT STORAGE DEVICE, AND POWER UNIT

(71) Applicant: Panasonic Holdings Corporation, Osaka (JP)

(72) Inventors: Ryuichi Ozaki, Osaka (JP); Kou Sugano, Osaka (JP)

(73) Assignee: PANASONIC HOLDINGS CORPORATION, Osaka (JP)

( * ) Notice: Subject to any disclaimer, the term of this patent is extended or adjusted under 35 U.S.C. 154(b) by 197 days.

This patent is subject to a terminal disclaimer.

(21) Appl. No.: 18/015,496

(22) PCT Filed: Jul. 16, 2021

(86) PCT No.: PCT/JP2021/026888
§ 371 (c)(1),
(2) Date: Jan. 10, 2023

(87) PCT Pub. No.: WO2022/019246
PCT Pub. Date: Jan. 27, 2022

(65) Prior Publication Data
US 2023/0250749 A1 Aug. 10, 2023

(30) Foreign Application Priority Data

Jul. 21, 2020 (JP) ................. 2020-124419

(51) Int. Cl.
*F01P 7/16* (2006.01)
*F28D 20/02* (2006.01)

(52) U.S. Cl.
CPC ............... *F01P 7/16* (2013.01); *F28D 20/02* (2013.01)

(58) Field of Classification Search
CPC ...... F28D 20/02; F28D 20/021; F28D 20/025; F28D 20/028; F01M 5/021; F02N 19/10; F24H 7/04
See application file for complete search history.

(56) References Cited

U.S. PATENT DOCUMENTS 10,138,798 B2 * 11/2018 Eilemann ................. F01P 11/08
2009/0236435 A1 * 9/2009 Kudo ..................... F28D 1/0426
165/104.11

(Continued)

FOREIGN PATENT DOCUMENTS

| JP | S64-046582 A | 2/1989 |
| JP | H02-042045 U | 3/1990 |

(Continued)

OTHER PUBLICATIONS

International Search Report dated Sep. 28, 2021 issued in International Patent Application No. PCT/JP2021/026888, with English translation.

*Primary Examiner* — Syed O Hasan
(74) *Attorney, Agent, or Firm* — Rimon P.C.

(57) ABSTRACT

A supercooling release device according to one aspect of the present disclosure releases a supercooled state of a heat storage material. The supercooling release device includes a first member and a second member capable of being brought into contact with each other. The first member and the second member each include a metal. While a load is continuously applied to at least one of the first member and the second member to bring at least a portion of a surface of the first member and at least a portion of a surface of the second member into close contact with each other, the supercooled state is maintained. When the supercooled state is to be released, the supercooling release device reduces the above load.

20 Claims, 14 Drawing Sheets

(56) References Cited

U.S. PATENT DOCUMENTS

| | | | |
|---|---|---|---|
| 2017/0226904 A1* | 8/2017 | Mehring | F01M 5/021 |
| 2020/0030930 A1* | 1/2020 | Fischer | C09K 5/066 |
| 2022/0187029 A1 | 6/2022 | Ozaki et al. | |

FOREIGN PATENT DOCUMENTS

| | | | | |
|---|---|---|---|---|
| JP | H02189226 A | * | 7/1990 | |
| JP | H03-096335 U | | 10/1991 | |
| JP | 2010054162 A | * | 3/2010 | F28D 20/02 |
| JP | 2010-105570 A | | 5/2010 | |
| JP | 2014-009818 A | | 1/2014 | |
| JP | 2015158306 A | * | 9/2015 | |
| WO | 2020/189089 A1 | | 9/2020 | |

* cited by examiner

SUPERCOOLING CANCELLATION DEVICE, HEAT STORAGE DEVICE, AND POWER UNIT

CROSS-REFERENCE OF RELATED APPLICATIONS

This application is the U.S. National Phase under 35 U.S.C. § 371 of International Patent Application No. PCT/JP2021/026888, filed on Jul. 16, 2021, which in turn claims the benefit of Japanese Patent Application No. 2020-124419, filed on Jul. 21, 2020, the entire disclosures of which Applications are incorporated by reference herein.

TECHNICAL FIELD

The present disclosure relates to a supercooling release device, a heat storage device, and a power device.

BACKGROUND ART

Heat storage devices have been conventionally known according to which heat storage and heat release are performed by phase transition of a heat storage material between a liquid phase and a solid phase. Such a heat storage device includes a supercooling release device releasing a supercooled state of a supercooled heat storage material. The heat storage device, which includes the supercooling release device, is used, for example, in a power device including a powertrain such as a gasoline engine or an electric motor.

Patent Literatures 1 to 3 each disclose a conventional supercooling release device that releases a supercooled state of a heat storage material by utilizing bending deformation of a flexible member. Specifically, in the supercooling release device of Patent Literature 1, a trigger coil spring is externally pressed to be bent and deformed to generate a sliding frictional force. This sliding frictional force releases the supercooled state of the heat storage material. In the supercooling release devices of Patent Literatures 2 and 3, a flexible plate-shaped member is externally pressed to be bent and deformed. This deformation brings crystals of the heat storage material into contact with the surrounding heat storage material in the supercooled state thus to release the supercooled state of the heat storage material.

CITATION LIST

Patent Literature

Patent Literature 1: Microfilm of Japanese Utility Model Application No. S63(1988)-121489 (JP H2(1990)-42045 U1)
Patent Literature 2: Microfilm of Japanese Utility Model Application No. H2(1990)-54363 (JP H3(1991)-96335 U1)
Patent Literature 3: JP 2015-158306 A

SUMMARY OF INVENTION

Technical Problem

To release the supercooled state by using the above conventional supercooling release device, bending deformation of the flexible member needs an operation of newly applying an external load or increasing an external load. In these supercooling devices, the member for releasing the supercooled state can be bent and deformed even when an unintended force is externally applied in the supercooled state. Consequently, depending on the use environment, the supercooled state may be released at an unintended time due to an unavoidable vibration, a sudden collision with an object, or the like.

The present disclosure provides a novel supercooling release device suitable for releasing the supercooled state at an intended time.

Solution to Problem

A supercooling release device according to one aspect of the present disclosure is a supercooling release device that releases a supercooled state of a heat storage material, the supercooling release device including
 a first member and a second member capable of being brought into contact with each other, wherein
 the first member and the second member each include a metal,
 while a load is continuously applied to at least one of the first member and the second member to bring at least a portion of a surface of the first member and at least a portion of a surface of the second member into contact with each other, the supercooled state is maintained, and
 when the supercooled state is to be released, the load is reduced.

Advantageous Effects of Invention

According to the present disclosure, it is possible to provide a novel supercooling release device suitable for releasing the supercooled state at an intended time.

DESCRIPTION OF EMBODIMENTS

Figure 1:
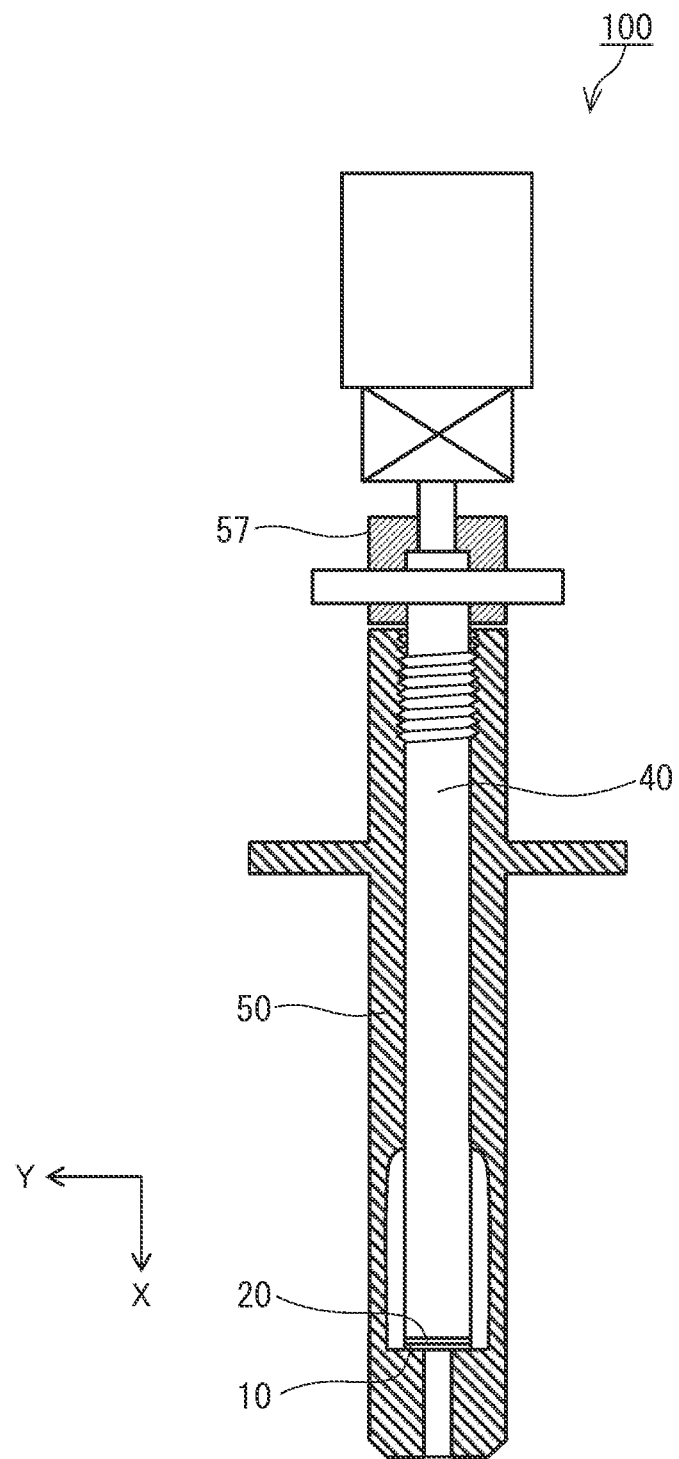
FIG. 1 is a schematic cross-sectional view of a supercooling release device according to Embodiment 1 of the present disclosure.

Findings on which the Present Disclosure is Based

In the above supercooling release devices in which bending deformation of the flexible member is indispensable, a sudden or accidental bending deformation of the member may occur due to an external stress represented by a vibration and a collision or an internal stress that can be generated by a thermal expansion. Such a deformation may release the supercooled state of the heat storage material at an unintended time. Further, such a deformation may cause a small space that needs to remain sealed to communicate with the surroundings, and may melt crystals of the heat storage material housed in the small space to deteriorate the supercooling release function in some cases. An impact such as a vibration can occur markedly when the supercooling release device is disposed in a power device such as a vehicle.

As a result of intensive studies, the present inventors have found that it is possible to achieve a supercooling release device that stably exhibits the supercooling release function, by providing a supercooling release device in which a first member and a second member are capable of being brought into contact with each other and each include a metal, while a load is continuously applied to at least one of the first member and the second member to bring these members into contact with each other, a supercooled state is maintained, and when the supercooled state is to be released, the load is reduced.

A supercooling release device according to a first aspect of the present disclosure is a supercooling release device that releases a supercooled state of a heat storage material, the supercooling release device including
   a first member and a second member capable of being brought into contact with each other, wherein
   the first member and the second member each include a metal,
   while a load is continuously applied to at least one of the first member and the second member to bring at least a portion of a surface of the first member and at least a portion of a surface of the second member into contact with each other, the supercooled state is maintained, and
   when the supercooled state is to be released, the load is reduced.

According to the first aspect, it is possible to release the supercooled state of the heat storage material, for example, by the following method. First, while no external load is applied to the first member and the second member, the supercooling release device is brought into contact with the heat storage material in the supercooled state. When the supercooling release device is brought into contact with the heat storage material, this stimulation causes crystallization of the heat storage material to proceed. Thus, the crystals of the heat storage material are disposed between the first member and the second member. Next, a load is applied to at least one of the first member and the second member to bring the first member and the second member into close contact with each other. When the heat storage material is heated in this state, a portion of the heat storage material present around the supercooling release device melts. On the other hand, a minute amount of a portion of the heat storage material present between the first member and the second member maintains a crystalline state. Next, when the heat storage material is cooled, the portion of the heat storage material present around the supercooling release device changes to a supercooled state. Next, when the above load is reduced, the heat storage material in the supercooled state enters between the first member and the second member to come into contact with the crystals of the heat storage material. This releases the supercooled state of the heat storage material thus to solidify the heat storage material. Thus, in the supercooling release device, while a load is continuously applied to at least one of the first member and the second member to bring these members into contact with each other, the supercooled state is maintained, and when the supercooled state is to be released, the load is reduced. Such a supercooling release device is suitable for releasing the supercooled state at an intended time.

In a second aspect of the present disclosure, for example, in the supercooling release device according to the first aspect, the first member and the second member each may be plate-shaped. According to the second aspect, the supercooling release device is suitable for releasing the supercooled state at an intended time.

In a third aspect of the present disclosure, for example, in the supercooling release device according to the second aspect, the first member and the second member may have, as the surfaces that are in contact with each other while the load is applied, surfaces that are each at least one selected from the group consisting of a flat surface and a non-flat surface, the non-flat surface elastically deforming upon application of the load to have an increased contact area. According to the third aspect, the supercooling release device is suitable for releasing the supercooled state at an intended time.

In a fourth aspect of the present disclosure, for example, the supercooling release device according to any one of the first to third aspects may further include a guide member configured to control displacement of the first member and the second member in a direction orthogonal to a direction in which the load is applied. According to the fourth aspect, the supercooling release device easily maintains the supercooling release function even after repeated use.

In a fifth aspect of the present disclosure, for example, in the supercooling release device according to the fourth aspect, the guide member may include at least one selected from the group consisting of a cylinder and a shaft, the cylinder may house the first member and the second member, and the shaft may be inserted into a through hole formed in the first member and a through hole formed in the second member. According to the fifth aspect, the supercooling release device easily maintains the supercooling release function even after repeated use.

In a sixth aspect of the present disclosure, for example, the supercooling release device according to any one of the first to fifth aspects may further include a third member, wherein the second member may be positioned between the first member and the third member, or the first member may be positioned between the second member and the third member, and the third member may have at least one selected from the group consisting of a flat surface and a non-flat surface, the non-flat surface elastically deforming upon application of the load to have an increased flatness. According to the sixth aspect, when the heat storage material is heated, a minute amount of a portion of the heat storage material present between the first member and the second member easily maintains a crystalline state. Since the crystal of the heat storage material reliably remains between the first member and the second member, the supercooling release device can release the supercooled state of the heat storage material with a high probability.

In a seventh aspect of the present disclosure, for example, the supercooling release device according to any one of the first to sixth aspects may further include a third member, wherein the second member may be positioned between the first member and the third member, or the first member may be positioned between the second member and the third member, and the third member may be a resin member. According to the seventh aspect, the third member easily elastically deforms by, for example, being compressed while being in contact with the first member or the second member. The elastically deformed third member can uniformly apply a load to the first member or the second member. This easily brings the first member and the second member into close contact with each other. Consequently, when the heat storage material is heated, a minute amount of a portion of the heat storage material present between the first member and the second member easily maintains a crystalline state. Since the crystals of the heat storage material reliably remain between the first member and the second member, the supercooling release device can release the supercooled state of the heat storage material with a high probability.

In an eighth aspect of the present disclosure, for example, the supercooling release device according to the sixth or seventh aspect may further include a fourth member, wherein the first member and the second member may be positioned between the third member and the fourth member, and the fourth member may have at least one selected from the group consisting of a flat surface and a non-flat surface, the non-flat surface elastically deforming upon application of the load to have an increased flatness. According to the eighth aspect, when the heat storage material is heated, a minute amount of the portion of the heat storage material present between the first member and the second member more easily maintains the crystalline state. Consequently, the supercooling release device can release the supercooled state of the heat storage material with a higher probability.

In a ninth aspect of the present disclosure, for example, in the supercooling release device according to any one of the first to eighth aspects, the first member and the second member may have, as the surfaces that are in contact with each other while the load is applied, flat surfaces. According to the ninth aspect, the supercooling release device is suitable for releasing the supercooled state at an intended time.

In a tenth aspect of the present disclosure, for example, in the supercooling release device according to any one of the first to ninth aspects, the metal may have a thermal conductivity of less than 225 W/m·K at 25° C. According to the tenth aspect, when a portion of the heat storage material present around the supercooling release device is heated, a minute amount of the portion of the heat storage material present between the first member and the second member is less likely to melt. Consequently, the supercooling release device tends to be able to release the supercooled state of the heat storage material with a high probability.

In an eleventh aspect of the present disclosure, for example, in the supercooling release device according to any one of the first to tenth aspects, when the supercooled state is to be released, the load may be reduced to displace the first member and the second member relative to each other such that the heat storage material in the supercooled state enters between the first member and the second member. According to the eleventh aspect, the cooling release device is suitable for releasing the supercooled state at an intended time.

In a twelfth aspect of the present disclosure, for example, in the supercooling release device according to any one of the first to eleventh aspects, the first member and the second member may have, in the surfaces that are in contact with each other while the load is applied, no concave portion in which a crystal of the heat storage material is to be housed. According to the twelfth aspect, the first member and the second member can be easily prepared.

In a thirteenth aspect of the present disclosure, for example, the supercooling release device according to any one of the first to twelfth aspects may further include a piston configured to apply a load to at least one of the first member and the second member. According to the thirteenth aspect, the reproducibility of the operations of the supercooling release device is improved by the piston.

In a fourteenth aspect of the present disclosure, for example, the supercooling release device according to any one of the first to thirteenth aspects may further include a cylinder housing the first member and the second member. According to the fourteenth aspect, the reproducibility of the operations of the supercooling release device is improved.

A heat storage device according to a fifteenth aspect of the present disclosure includes:
  the supercooling release device according to any one of the first to fourteenth aspects;
  a heat storage material including at least one selected from the group consisting of a salt hydrate, a sugar alcohol, and a clathrate hydrate; and
  a container housing the heat storage material.

According to the fifteenth aspect, in the heat storage device, the supercooling release device is suitable for releasing the supercooled state at an intended time.

A power device according to a sixteenth aspect of the present disclosure includes:
  the heat storage device according to the fifteenth aspect; and
  a powertrain configured to receive heat released from the heat storage device.

According to the sixteenth aspect, the powertrain can reduce fuel consumption or power consumption during a warm-up operation.

A supercooling release device according to a seventeenth aspect of the present disclosure is a supercooling release device that releases a supercooled state of a heat storage material, the supercooling release device including:
  a first member and a second member capable of being brought into contact with each other; and
  a load application member configured: to continuously apply, to at least one of the first member and the second member, a load for bringing at least a portion of a surface of the first member and at least a portion of a surface of the second member into contact with each other to maintain the supercooled state; and when the supercooled state is to be released, to reduce the load, wherein
  the first member and the second member each include a metal, and are each plate-shaped.

According to the seventeenth aspect, the supercooling release device is suitable for releasing the supercooled state of the heat storage material at an intended time.

In an eighteenth aspect of the present disclosure, for example, the supercooling release device according to the seventeenth aspect may further include a guide member configured to control displacement of the first member and the second member in a direction orthogonal to a direction in which the load is applied. According to the eighteenth aspect, the supercooling release device easily maintains the supercooling release function even after repeated use.

In a nineteenth aspect of the present disclosure, for example, in the supercooling release device according to the eighteenth aspect, the guide member may include at least one selected from the group consisting of a cylinder and a shaft, the cylinder may house the first member and the second member, and the shaft may be inserted into a through hole formed in the first member and a through hole formed in the second member. According to the nineteenth aspect, the supercooling release device easily maintains the supercooling release function even after repeated use.

Embodiments of the present disclosure will be described below with reference to the drawings. The following embodiments are only illustrative, and the present disclosure is not limited to the following embodiments.

Embodiment 1

FIG. 1 is a schematic cross-sectional view of a supercooling release device 100 of Embodiment 1. As shown in FIG. 1, the supercooling release device 100 includes a first member 10 and a second member 20 capable of being brought into contact with each other. In the present embodiment, a direction X refers to a direction from the second member 20 to the first member 10, and is an example of a direction in which a load for bringing the first member 10 and the second member 20 into contact with each other is applied. A direction Y refers to a direction orthogonal to the direction X.

In the supercooling release device 100, crystals of a heat storage material can be housed between the first member 10 and the second member 20. By bringing the first member 10 and the second member 20 into close contact with each other while holding the crystals of the heat storage material between the first member 10 and the second member 20, entry of a liquid portion of the heat storage material between the first member 10 and the second member 20 is restricted. This easily remains the crystals of the heat storage material between the first member 10 and the second member 20 even after a heat storage process for storing heat in the heat storage material. Through the heat storage process, the heat storage material stores heat by maintaining in a liquid phase and a supercooled state. Restriction on entry of the liquid portion of the heat storage material between the first member 10 and the second member 20 maintains the heat storage material in the supercooled state. When the second member 20 is moved away from a surface of the first member 10 while the heat storage material is supercooled, the heat storage material in the supercooled state comes into contact with the crystals of the heat storage material remaining between the first member 10 and the second member 20. This releases the supercooled state of the heat storage material thus to solidify the heat storage material. The phrase "bring the first member 10 and the second member 20 into close contact with each other" used herein means to bring the first member 10 and the second member 20 into contact with each other such that entry of the liquid portion of the heat storage material between the first member 10 and the second member 20 is restricted.

Figure 2:
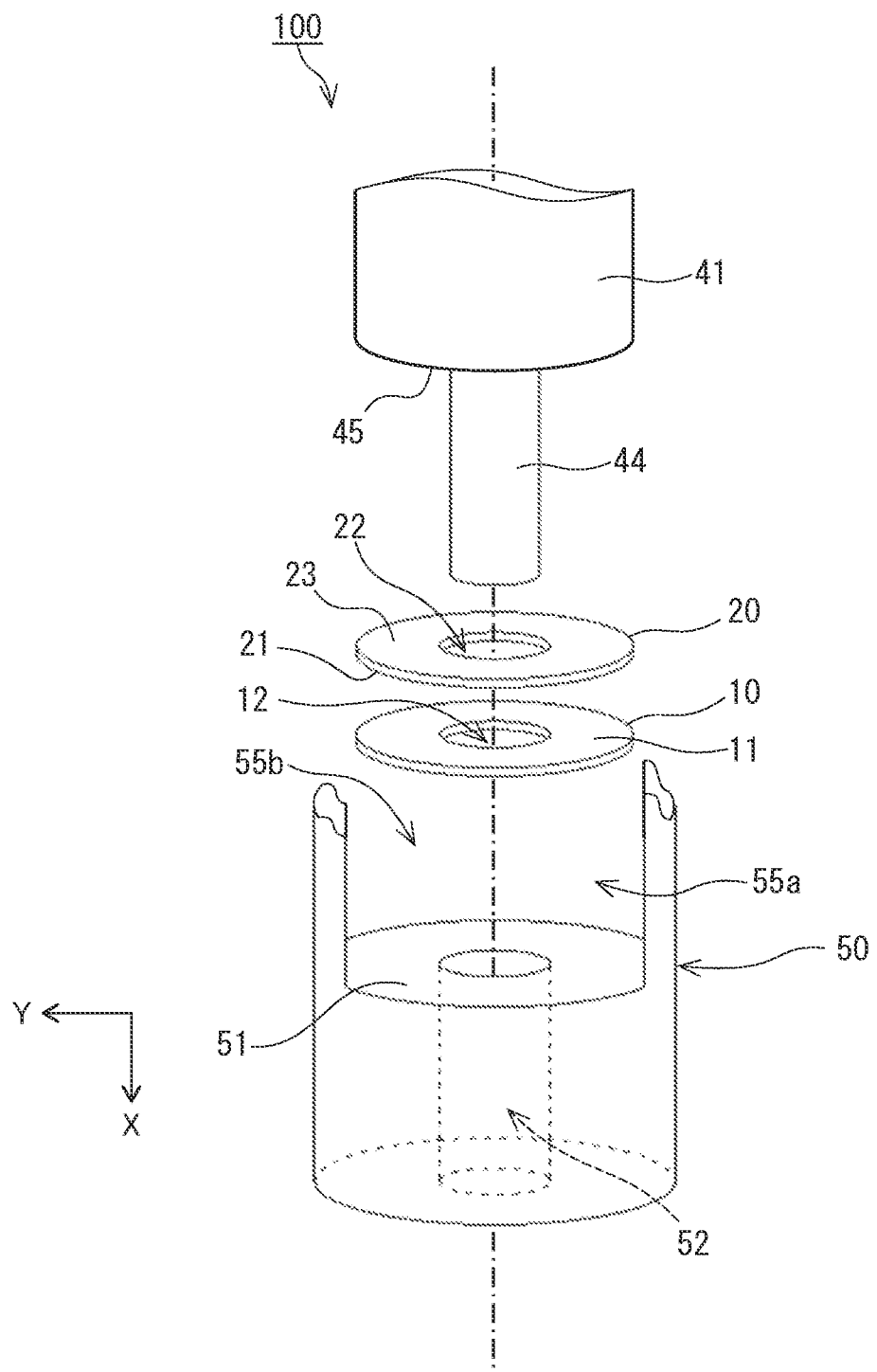
FIG. 2 is an exploded perspective view showing a portion of the supercooling release device shown in FIG. 1.

FIG. 2 is an exploded perspective view showing a portion of the supercooling release device 100. As shown in FIGS. 1 and 2, the first member 10 is, for example, plate-shaped. The first member 10 is, for example, circular in plan view. The first member 10 may be rectangular in plan view. The first member 10 may be flat plate-shaped or corrugated plate-shaped. The corrugated plate-shaped first member 10 is, for example, elastically deformable. The "corrugated plate shape" will be described in detail with regard to a third member described later. The first member 10 may have a shape of a spring washer as specified in JIS B1251: 2018, and may have a shape of a conical spring washer.

The first member 10 has a surface 11 facing the second member 20 and capable of being brought into contact with the second member 20. The surface 11 is, for example, a main surface of the first member 10, and is a surface having the largest area of the first member 10. The surface 11 has, for example, at least one selected from the group consisting of a flat surface and a non-flat surface, where the non-flat surface elastically deforms upon application of a load to have an increased contact area with the second member 20. In an example, the surface 11 of the flat plate-shaped first member consists substantially of a flat surface. The surface 11 of the corrugated plate-shaped first member 10 consists substantially of a non-flat surface that elastically deforms upon application of a load to have an increased contact area with the second member 20. The non-flat surface may elastically deform upon application of a load to have an increased flatness. The non-flat surface has, for example, undulations. The non-flat surface may have steps instead of or along with undulations.

The surface 11 may be capable of being brought into surface contact with the second member 20. The surface 11 that is capable of being brought into surface contact with the second member 20 is suitable for restricting entry of the liquid portion of the heat storage material between the first member 10 and the second member 20. The surface 11 having a flat surface is suitable for being brought into surface contact with the second member 20. However, the surface 11 even with no flat surface is capable of being brought into surface contact with the second member 20 as long as the surface 11 has a shape conforming to the shape of the second member 20.

The first member 10 has, for example, in the surface 11, no concave portion in which crystals of the heat storage material are to be housed. Specifically, the first member 10 has, for example, in the surface 11, no concave portion that can be visually observed. In an example, the surface 11 of the first member 10 is flat over the entire area thereof. In the present embodiment, since no concave portion needs to be formed in the first member 10, the first member 10 can be easily prepared.

When the first member 10 is brought in contact with the second member 20, the ratio of the contact area between the surface 11 and the second member 20 to the area of the surface 11 is not particularly limited. The surface 11 may be configured such that the entirety thereof is capable of being brought into contact with the second member 20.

The first member 10 may have a through hole 12. The through hole 12 extends, for example, in the thickness direction of the first member 10 or in the direction X. The through hole 12 is, for example, circular in plan view. The through hole 12 is positioned, for example, around the center of gravity of the surface 11 of the first member 10. The first member 10 is ring-shaped in plan view due to the through hole 12. The through hole 12 has a diameter of, for example, 1 mm or more and 5 mm or less.

The first member 10 contains a metal. Specifically, the surface 11 of the first member 10 is formed from a material containing the metal. The first member 10 may have a body portion and a coating layer. The coating layer is formed from the material containing the metal and covers the body portion. The body portion of the first member may or may not contain the metal. The first member 10 may contain the metal as a main component. The term "main component" means a component having the largest amount by weight in the first member 10. The first member 10, for example, consists substantially of the metal. The phrase "consist substantially of" means to exclude other components that modify the essential characteristics of the material referred to. However, the first member 10 may contain impurities in addition to the metal.

The thermal conductivity of the metal contained in the first member 10 at 25° C. is not particularly limited, and may be, for example, 300 W/m·K or less, less than 225 W/m·K, 100 W/m·K or less, 50 W/m·K or less, or 20 W/m·K or less. The lower limit value for the thermal conductivity of the metal is not particularly limited, and is, for example, 10 W/m·K.

Examples of the metal contained in the first member 10 include copper, aluminum, iron, nickel, and titanium. The metal contained in the first member 10 may be an alloy. Examples of the alloy contained in the first member 10 include an alloy containing the above metal, stainless steel, and brass. A specific example of the stainless steel is SUS304.

The first member 10 may or may not contain a metal oxide. In particular, in the case where the first member 10 has the body portion and the coating layer, the coating layer may not contain a metal oxide. The content of the metal oxide in the entire first member 10 or in the coating layer is not particularly limited, and is, for example, 10 wt % or less.

The thickness of the first member 10 is not particularly limited, and is, for example, 0.01 mm or more, and may be 0.05 mm or more, 0.1 mm or more, 0.3 mm or more, or 0.5 mm or more. The upper limit value for the thickness of the first member 10 is not particularly limited, and is, for example, 10 mm. The term "thickness" used herein means the average thickness. The average thickness is, for example, the average value of thicknesses measured at a plurality of random points (at least five points) in the member.

A specific example of the first member 10 is a commercially available ring-shaped flat plate. The first member 10 may be a metal wave washer.

As shown in FIGS. 1 and 2, the second member 20 is, for example, plate-shaped. The second member 20 is, for example, circular in plan view. The second member 20 may be rectangular in plan view. The second member 20 may be flat plate-shaped or corrugated plate-shaped. The corrugated plate-shaped second member 20 is, for example, elastically deformable. The "corrugated plate shape" will be described in detail with regard to the third member described later. The second member 20 may have a shape of a spring washer as specified in JIS B1251: 2018, and may have a shape of a conical spring washer. In an example, the first member 10 and the second member 20 each may be plate-shaped.

The second member 20 has a surface 21 facing the first member 10 and capable of being brought into contact with the first member 10. The surface 21 and the surface 11 are brought into contact with each other, for example, while a load is applied to at least one of the second member 20 and the first member 10. The surface 21 is, for example, a main surface of the second member 20, and is a surface having the largest area of the second member 20. The surface 21 has, for example, at least one selected from the group consisting of a flat surface and a non-flat surface, where the non-flat surface elastically deforms upon application of a load to have an increased contact area with the first member 10. In other words, the first member 10 and the second member 20 may have, as the surfaces that are in contact with each other while an external load is applied, surfaces that are each at least one selected from the group consisting of a flat surface and a non-flat surface, which elastically deforms upon application of a load to have an increased contact area, or the first member 10 and the second member 20 may have, as the surfaces that are in contact with each other while a load is applied from the outside, flat surfaces. In an example, the surface 21 of the flat plate-shaped second member 20 consists substantially of a flat surface. The surface 21 of the corrugated plate-shaped second member 20 consists substantially of a non-flat surface that elastically deforms upon application of a load to have an increased contact area with the first member 10.

The surface 21 may be capable of being brought into surface contact with the surface 11 of the first member 10. The surface 21 that is capable of being brought into surface contact with the first member 10 is suitable for restricting entry of the liquid portion of the heat storage material between the first member 10 and the second member 20. The surface 21 having a flat surface is suitable for being brought into surface contact with the first member 10. However, the surface 21 even with no flat surface is capable of being brought into surface contact with the first member 10 as long as the surface 21 has a shape conforming to the shape of the first member 10.

The second member 20 has, for example, in the surface 21, no concave portion in which crystals of the heat storage material are to be housed. In other words, the first member 10 and the second member 20 have, for example, in the surfaces that are in contact with each other while an external load is applied, no concave portion in which crystals of the heat storage material are to be housed. Specifically, the second member has, for example, in the surface 21, no concave portion that can be visually observed. In an example, the surface 21 of the second member 20 is flat over the entire area thereof. In the present embodiment, since no concave portion needs to be formed in the second member 20, the second member 20 can be easily prepared.

When the second member 20 is brought into contact with the first member 10, the ratio of the contact area between the surface 21 and the first member 10 to the area of the surface 21 is not particularly limited. The surface 21 may be configured such that the entirety thereof is capable of being brought into contact with the surface 11 of the first member 10.

The second member 20 may have a through hole 22. The through hole 22 extends, for example, in the thickness direction of the second member 20 or in the direction X. The through hole 22 is, for example, circular in plan view. The through hole 22 is positioned, for example, around the center of gravity of the surface 21 of the second member 20. The second member 20 is ring-shaped in plan view due to the through hole 22. The through hole 22, for example, overlaps the through hole 12 of the first member 10. The diameter of the through hole 22 may be the same as or different from the diameter of the through hole 12 of the first member 10.

The second member 20 contains a metal. Specifically, the surface 21 of the second member 20 is formed from a material containing the metal. The second member may have a body portion and a coating layer. The coating layer is formed from the material containing the metal and covers the body portion. The body portion of the second member 20 may or may not include the metal. The second member 20 may contain the metal as a main component. The second member 20, for example, consists substantially of the metal. However, the second member 20 may contain impurities in addition to the metal.

The thermal conductivity of the metal contained in the second member 20 at 25° C. is not particularly limited, and may be, for example, 300 W/m·K or less, less than 225 W/m·K, 100 W/m·K or less, 50 W/m·K or less, or 20 W/m·K or less. The lower limit value for the thermal conductivity of the metal is not particularly limited, and is, for example, 10 W/m·K. In particular, the metal contained in the first member 10 and the metal contained in the second member 20 each may have a thermal conductivity of less than 225 W/m·K at 25° C.

Examples of the metal contained in the second member 20 include copper, aluminum, iron, nickel, and titanium. The metal contained in the second member 20 may be an alloy. Examples of the alloy contained in the second member 20 include an alloy containing the above metal, stainless steel, and brass. The metal contained in the second member 20 may be the same as or different from the metal contained in the first member 10. In an example, at least one selected from the group consisting of the first member 10 and the second member 20 may contain stainless steel.

The second member 20 may or may not contain a metal oxide. In particular, in the case where the second member 20 has the body portion and the coating layer, the coating layer may not contain a metal oxide. The content of the metal oxide in the entire second member 20 or in the coating layer is not particularly limited, and is, for example, 10 wt % or less.

The thickness of the second member 20 is not particularly limited, and is, for example, 0.01 mm or more, and may be 0.05 mm or more, 0.1 mm or more, 0.3 mm or more, or 0.5 mm or more. The upper limit value for the thickness of the second member 20 is not particularly limited, and is, for example, 10 mm.

A specific example of the second member 20 is a commercially available ring-shaped flat plate. The second member 20 may be a metal wave washer. The material and the shape of the second member 20 may be the same as or different from those of the first member 10.

As shown in FIG. 1, the supercooling release device 100 may further include a load application member 40 and a cylinder 50. The load application member 40 can maintain the supercooled state of the heat storage material by continuously applying a load to at least one of the first member 10 and the second member 20 to bring at least a portion of the surface 11 of the first member 10 and at least a portion of the surface 21 of the second member 20 into contact with each other. Further, when the supercooled state of the heat storage material is to be released, the load application member 40 can reduce the above load.

The present disclosure, in another aspect thereof, provides a supercooling release device 100 that releases a supercooled state of a heat storage material, the supercooling release device 100 including:
  a first member 10 and a second member 20 capable of being brought into contact with each other; and
  a load application member configured: to continuously apply, to at least one of the first member 10 and the second member 20, a load for bringing at least a portion of a surface 11 of the first member 10 and at least a portion of a surface 21 of the second member 20 into contact with each other to maintain the supercooled state; and when the supercooled state is to be released, to reduce the load, wherein
  the first member 10 and the second member 20 each include a metal, and are each plate-shaped.

Figure 3:
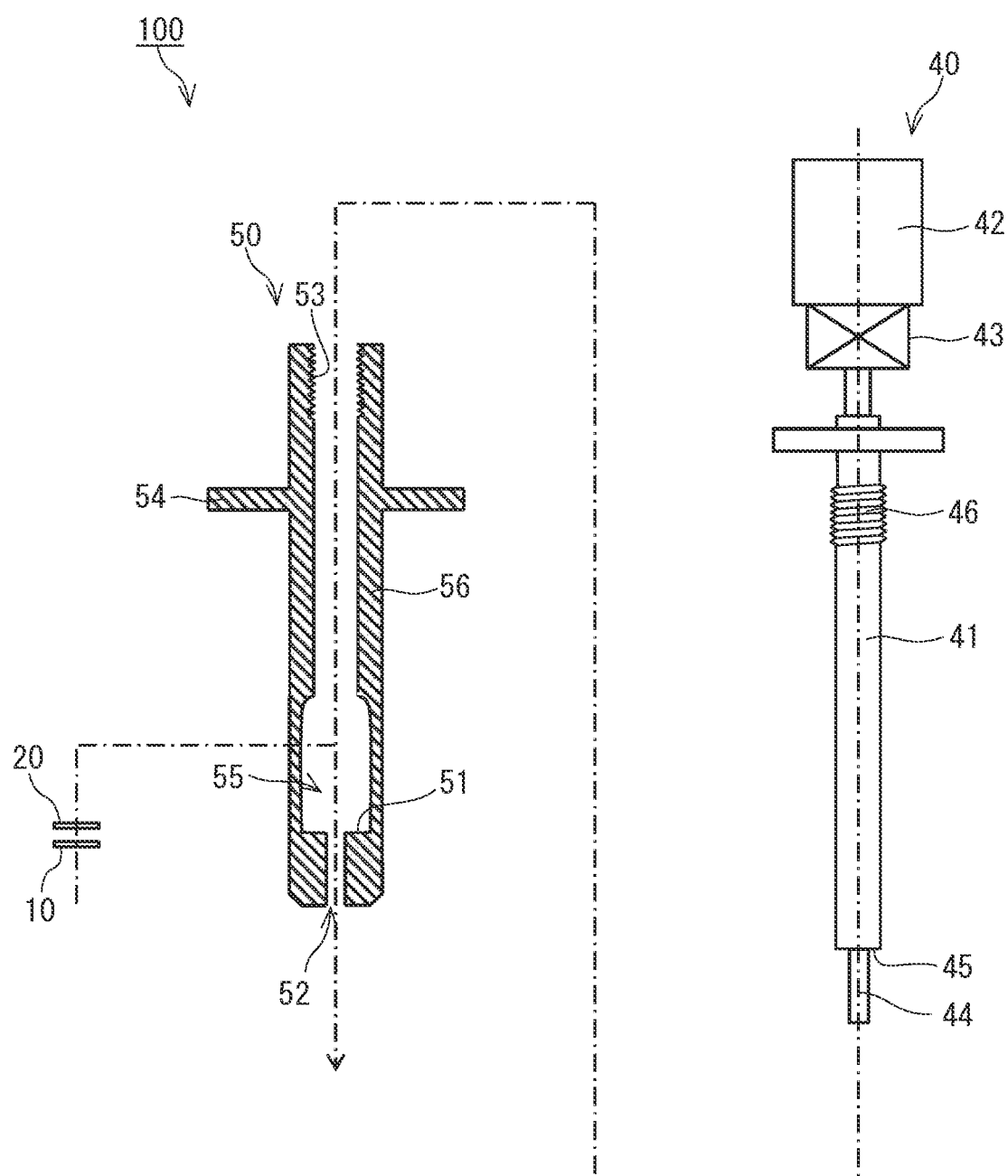
FIG. 3 is an exploded view of the supercooling release device shown in FIG. 1.

FIG. 3 is an exploded view of the supercooling release device 100 of FIG. 1. As shown in FIG. 3, the load application member 40 includes, for example, a first shaft 41, a motor 42, a gear 43, and a second shaft 44. The first shaft 41 functions as a piston applying a load to at least one of the first member 10 and the second member 20. Specifically, one end of the first shaft 41 is connected to the motor 42 via the gear 43. The other end of the first shaft 41 is connected to the second shaft 44. An edge face 45 of the first shaft 41 is in contact with an edge face of the second shaft 44. The edge face 45 is a surface of the first shaft 41 facing the first member 10 or the second member 20.

The motor 42 functions as an actuator displacing the first shaft 41. As described later, the motor 42 can displace the first shaft 41 in a direction to the first member 10 or the second member 20 and in a direction away from the first member 10 or the second member 20. Specifically, the motor 42 applies a torque to the first shaft 41 to rotate the first shaft 41. The motor 42 can displace the first shaft 41 by using a screw mechanism.

The gear 43 adjusts a torque to be applied to the first shaft 41. The torque to be applied to the first shaft 41 is not particularly limited, and may be 0.01 N·m or more and 3.0 N·m or less, or 0.2 N·m or more and 3.0 N·m or less. The second shaft 44 and the first shaft 41 each extend, for example, in the direction X. The diameter of the edge face of the second shaft 44 is smaller than the diameter of the edge face 45 of the first shaft 41. Accordingly, a portion of the edge face 45 of the first shaft 41 is exposed outside the load application member 40.

As shown in FIGS. 1 and 2, the second shaft 44 is inserted into the through hole 12 of the first member 10 and the through hole 22 of the second member 20. Thus, the first member 10 and the second member 20 are fixed by the load application member 40. The edge face 45 of the first shaft 41, for example, covers a surface 23 of the second member 20 facing the surface 21 of the second member 20. The edge face 45 of the first shaft 41 may entirely cover the surface 23 of the second member 20 or may partially cover the surface 23 of the second member 20. The edge face 45 of the first shaft 41 can be brought into contact with the surface 23 of the second member 20.

As shown in FIGS. 1 and 3, for example, a screw portion 46 functioning as a male screw is formed on a side surface of the first shaft 41. The screw portion 46 can be screwed together with a screw portion 53 of the cylinder 50 described later. Thus, the screw portions 46 and 53 constitute the screw mechanism. By using this screw mechanism, the first shaft 41 can move forward and backward in the direction X. Specifically, when the first shaft 41 is rotated clockwise by the motor 42, the screw portion 46 is screwed into the screw portion 53, and thus the first shaft 41 moves in the direction X. When the edge face 45 of the first shaft 41 is in contact with the surface 23 of the second member 20, movement of the first shaft 41 in the direction X can apply a load to the second member 20 in the direction X. Application of the load to the second member 20 brings the first member 10 and the second member 20 into close contact with each other. On the other hand, when the first shaft 41 is rotated counter-clockwise by the motor 42, the screw portion 46 is loosened, and thus the first shaft 41 moves in a direction opposite to the direction X. Thus, the load applied to the second member 20 is reduced and removed.

In FIG. 1, the second member 20 is disposed between the first member 10 and the first shaft 41. However, the position of the second member 20 and the position of the first member 10 may be replaced with each other. That is, the first member 10 may be disposed between the second member 20 and the first shaft 41. In this case, the load application member 40 can apply a load to the first member 10 in a direction from the first member 10 to the second member 20. In this way, the supercooling release device 100 can, by the load application member 40, apply a load to at least one of the first member 10 and the second member 20. Specifically, the load application member 40 can apply a load to at least one of the first member 10 and the second member 20 while at least a portion of the surface 11 of the first member 10 and at least a portion of the surface 21 of the second member 20 are in contact with each other. This allows the first member 10 and the second member 20 to be brought into close contact with each other. Between the load application member 40 and the first member 10 or the second member 20, another member may be disposed such as the third member described later. In this case, the load application member 40 can apply a load to at least one of the first member 10 and the second member 20 via the other member.

In the case where the first shaft 41 contains a metal and the edge face 45 thereof faces the surface 11 of the first member 10 and can be brought into contact with the surface 11, the first shaft 41 can also function as the second member. In the case where the first shaft 41 functions as the second member, the supercooling release device 100 does not need to include the second member 20.

FIGS. 1 and 3 each show a cross section of the cylinder 50. The cylinder 50 houses the first member 10 and the second member 20. As shown in FIG. 3, the cylinder 50 has a body portion 56. The body portion 56 is, for example, cylindrical and extends in the direction X. The body portion 56 houses the first member 10, the second member 20, and the load application member 40. Specifically, the body portion 56 houses the first shaft 41 and the second shaft 44 of the load application member 40.

The body portion 56 has a support portion 51, a through hole 52, the screw portion 53, and an opening portion 55. The support portion 51 is, for example, a plane orthogonal to the direction X inside the body portion 56. The support portion 51 supports the first member 10 and the second member 20. Specifically, the first member 10 and the second member 20 are sandwiched between the support portion 51 and the first shaft 41. The support portion 51 is, for example, in contact with the first member 10.

The through hole 52 extends from the support portion 51 to one end of the body portion 56 in the direction X. The through hole 52 is, for example, circular in plan view. The through hole 52, for example, overlaps the through hole 12 of the first member 10. The diameter of the through hole 52 may be the same as or different from the diameter of the through hole 12 of the first member 10. The second shaft 44 of the load application member 40 is inserted into the through hole 52.

The opening portion 55 is formed on a side surface of the body portion 56. The opening portion 55 extends in the direction X. The support portion 51 is exposed outside the cylinder 50 through the opening portion 55. The first member 10 and the second member 20, which are housed in the body portion 56, are exposed outside the supercooling release device 100 through the opening portion 55. The number of the opening portions 55 is not particularly limited, and is, for example, 1 or more and 10 or less. As shown in FIG. 2, in the supercooling release device 100 of the present embodiment, the cylinder 50 has two opening portions 55a and 55b. The opening portion 55a and the opening portion 55b face each other. In FIG. 2, the body portion 56 of the cylinder 50 is partially omitted for description.

As shown in FIGS. 1 and 3, the screw portion 53 is formed inside the body portion 56 and functions as a female screw. The screw portion 53 is, for example, in contact with the other end of the body portion 56. As described above, the screw portion 53 can be screwed together with the screw portion 46 of the first shaft 41. In FIG. 1, the screw portion 46 of the first shaft 41 is screwed into the screw portion 53.

The cylinder 50 may further include a fixing portion 54. By the fixing portion 54, the supercooling release device 100 can be fixed to a heat storage device. The fixing portion 54, for example, has an opening into which a fastener such as a screw or a bolt can be screwed.

The supercooling release device 100 includes a guide member that controls displacement of the first member 10 and the second member 20 in the direction Y. In the supercooling release device 100, the guide member includes, for example, at least one selected from the group consisting of the cylinder 50 and the second shaft 44 of the load application member 40 described above. For example, the cylinder 50 can control displacement of the first member 10 and the second member 20 in the direction Y by housing the first member 10 and the second member 20. The second shaft 44 can control displacement of the first member 10 and the second member 20 in the direction Y by being inserted into the through hole 12 formed in the first member 10 and the through hole 22 formed in the second member 20.

As shown in FIG. 1, the supercooling release device 100 may further include a coupling portion 57. The coupling portion 57, for example, couples the motor 42 to the first shaft 41 in the load application member 40. The motor 42 may drive the first shaft 41 to rotate via the coupling portion 57.

Examples of the materials of the first shaft 41, the second shaft 44, and the cylinder 50 include a metal and a resin. Examples of the metal include copper and aluminum. The metal may be an alloy. Examples of the alloy include an alloy containing the above metal and stainless steel. Examples of the resin include polyphenylene sulfide and polyether ether ketone.

Next, an example of a method for using the supercooling release device 100 will be described.

First of all, preparation of the supercooling release device 100 is performed by the following method. While no external load is applied to the first member 10 and the second member 20, a tip portion of the supercooling release device 100 is brought into contact with a heat storage material in a supercooled state. Specifically, the supercooling release device 100 is immersed in the heat storage material such that the heat storage material in the supercooled state enters the body portion 56 of the cylinder 50 through the opening portion 55 of the cylinder 50. When the supercooling release device 100 is brought into contact with the heat storage material, this stimulation causes crystallization of the heat storage material to proceed. To facilitate crystallization of the heat storage material, crystals of the heat storage material may be adhered in advance to the portion of the supercooling release device 100 that is to be brought into contact with the heat storage material. The first member 10 and the second member 20 are not in close contact with each other. Accordingly, as the crystallization of the heat storage material proceeds, crystals of the heat storage material are disposed between the first member 10 and the second member 20.

Next, the motor 42 is operated to move the first shaft 41 in the direction X. This applies a load to the second member 20 in the direction X while at least a portion of the surface 11 of the first member 10 and at least a portion of the surface 21 of the second member 20 are in contact with each other. By this operation, a compressive load is applied to each of the first member 10 and the second member 20. A load L to be applied to the second member 20 is not particularly limited as long as the supercooled state of the heat storage material can be maintained. The load L is, for example, 0.5 MPa or more, and may be 1 MPa or more. The upper limit value for this load L is not particularly limited, and is, for example, 11 MPa, and may be 10.6 MPa.

The application of the load to the second member 20 in the direction X brings the second member 20 and the first member 10 into close contact with each other. At this time, the surface 21 may be in surface contact with the surface 11. Between the first member 10 and the second member 20, a minute amount of crystals of the heat storage material is housed. In the supercooling release device 100, since the first member 10 and the second member 20 each contain a metal, the crystals of the heat storage material easily remain between the first member 10 and the second member 20. Through the above operation, the preparation of the supercooling release device 100 is completed.

Next, a method for releasing the supercooled state of the heat storage material by using the supercooling release device 100 subjected to the above operation will be described. First, the heat storage material is heated. When the temperature of the heat storage material exceeds the melting point of the heat storage material, the heat storage material melts. At this time, the supercooling release device 100 continuously applies a load to the second member 20 to bring at least a portion of the surface 11 and at least a portion of the surface 21 into contact with each other. In other words, the state where the second member 20 and the first member 10 are in close contact with each other is maintained. This restricts contact between the portion of the heat storage material held between the first member 10 and the second member 20 and a portion of the heat storage material present around the supercooling release device 100. Thus, the portion of the heat storage material held between the first member 10 and the second member 20 is less likely to melt. That is, even after the heat storage material is heated, the portion of the heat storage material held between the first member 10 and the second member 20 easily maintains the crystalline state.

Next, the heat storage material is cooled. As a result, the temperature of the heat storage material falls below the melting point of the heat storage material, and thus the heat storage material is supercooled. At this time, the supercooling release device 100 continuously applies a load to the second member 20 to bring at least a portion of the surface 11 and at least a portion of the surface 21 into contact with each other. In other words, the state where the second member 20 and the first member 10 are in close contact with each other is maintained. This restricts contact between the portion of the heat storage material held between the first member 10 and the second member 20 and the portion of the heat storage material present around the supercooling release device 100. Thus, the supercooled state of the heat storage material is maintained.

Next, the motor 42 is operated at a desired time to move the first shaft 41 in the direction opposite to the direction X. This reduces the load applied to the second member 20. At this time, a load reduction amount D in the second member 20 is not particularly limited as long as the supercooled state of the heat storage material can be released. The reduction amount D is, for example, 0.5 MPa or more, and may be 1 MPa or more. The load reduction amount D may be the same as the load L applied to the second member 20 in the preparation phase of the supercooling release device 100. A load reduction ratio P in the second member 20 is not particularly limited, and is, for example, 10% or more, and may be 40% or more, 60% or more, or 100%. The load reduction ratio P means the ratio of the load reduction amount D (MPa) to the load L (MPa) applied to the second member 20 in the preparation phase of the supercooling release device 100.

When the load applied to the second member 20 is reduced, the second member 20 is displaced relative to the first member 10. In other words, the surface 21 of the second member 20 is slightly moved away from the surface 11 of the first member 10. At this time, the heat storage material in the supercooled state enters between the surface 21 of the second member 20 and the surface 11 of the first member 10. The heat storage material in the supercooled state comes into contact with the crystals of the heat storage material held between the first member 10 and the second member 20. That is, contact is allowed between the portion of the heat storage material held between the first member 10 and the second member 20 and the portion of the heat storage material present around the supercooling release device 100. This releases the supercooled state of the heat storage material thus to solidify the heat storage material. In other words, in the supercooling release device 100, when the supercooled state of the heat storage material is to be released, an external load is reduced to displace the first member 10 and the second member 20 relative to each other such that the heat storage material in the supercooled state enters between the first member 10 and the second member 20.

In the supercooling release device 100, it is possible: to maintain the supercooled state while continuously applying a load to at least one of the first member 10 and the second member 20, which are capable of being brought into contact with each other and each contain a metal, to bring these members into contact with each other; and to release the supercooled state by reducing the load. In the supercooling release device 100 having such a configuration, even when an external stress, such as a vibration, is applied, the crystals of the heat storage material held between the first member 10 and the second member 20 are less likely to come into contact with the portion of the heat storage material present around the supercooling release device 100 as long as a load is applied to bring the first member 10 and the second member 20 into contact with each other. Consequently, in the supercooling release device 100, it is possible to sufficiently suppress a sudden or accidental release of the supercooled state of the heat storage material and a deterioration of the supercooling release function for the heat storage material. That is, the supercooling release device 100 is suitable for releasing the supercooled state at an intended time.

Further, according to the supercooling release device 100 of the present embodiment, the supercooled state of the heat storage material can be released almost without utilizing deformation movement of the first member 10 and the second member 20. In other words, the supercooling release device 100 can release the supercooled state of the heat storage material substantially without utilizing bending deformation of a flexible member. Even after repeated use of the supercooling release device 100, fatigue is less likely to be accumulated in the first member 10 and the second member 20. Consequently, damages to the first member 10 and the second member 20 are less likely to occur. Further, plastic deformation of the first member 10 and the second member 20 hardly occurs, too. Thus, the supercooling release device 100 is suitable for long-term use.

In the supercooling release device 100 of the present embodiment, the first member 10, the second member 20, and the cylinder 50 have the through holes 12, 22, and 52, respectively. Accordingly, the heat storage material in the supercooled state can quickly enter between the first member 10 and the second member 20. The structure of the supercooling release device 100 of the present embodiment is suitable for releasing a supercooled state of a heat storage material. According to the supercooling release device 100 of the present embodiment, even in the case where the heat storage material is cooled after being heated to a high temperature, crystals of the heat storage material easily remain between the first member 10 and the second member 20, and thus the supercooled state of the heat storage material can be released with a high probability. In this way, the supercooling release device 100 of the present embodiment can release the supercooled state of the heat storage material with a high reliability.

Embodiment 2

Figure 4:
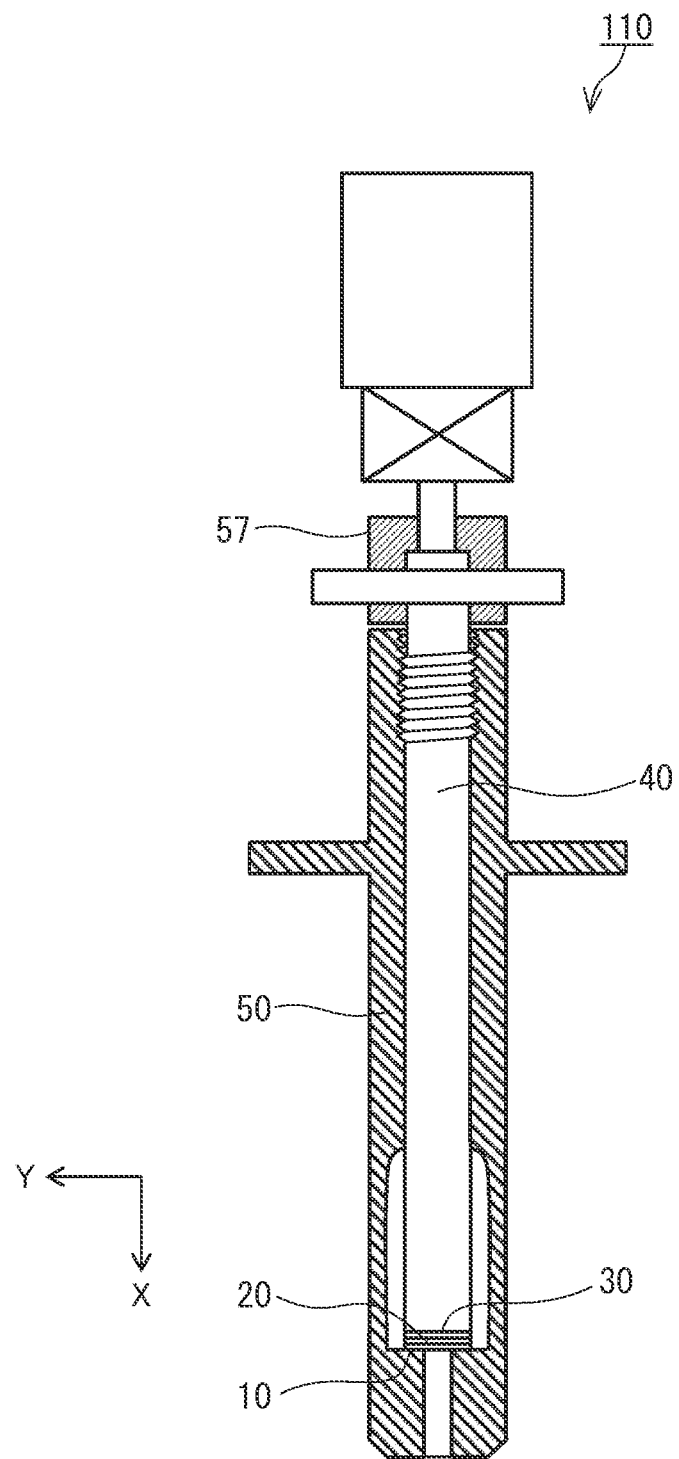
FIG. 4 is a schematic cross-sectional view of a supercooling release device according to Embodiment 2 of the present disclosure.
Figure 5:
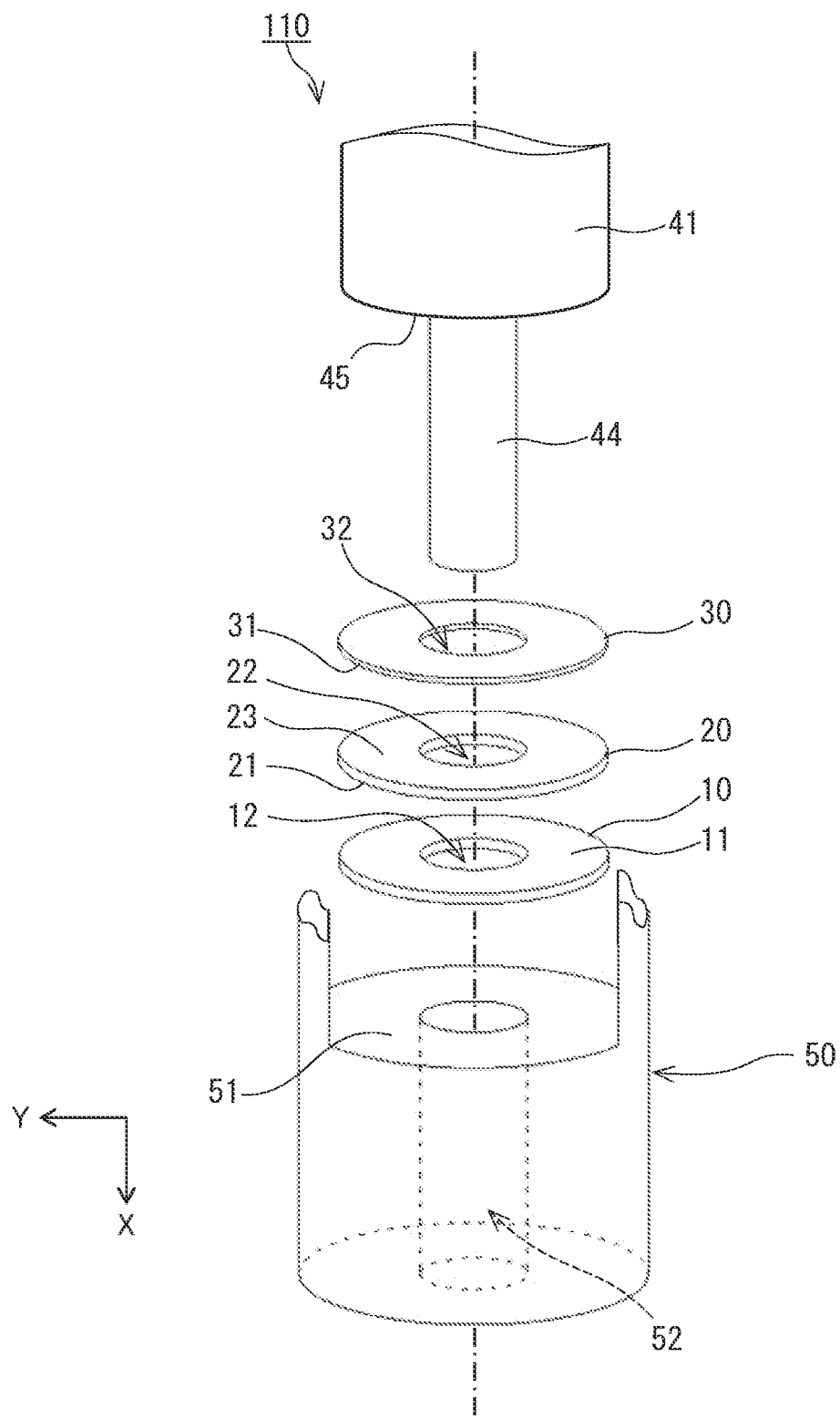
FIG. 5 is an exploded perspective view showing a portion of the supercooling release device shown in FIG. 4.

FIG. 4 is a schematic cross-sectional view of a supercooling release device 110 of the present Embodiment 2. FIG. 5 is an exploded perspective view showing a portion of the supercooling release device 110. As shown in FIGS. 4 and 5, the supercooling release device 110 further includes a third member 30. Except for the above, the structure of the supercooling release device 110 is the same as the structure of the supercooling release device 100 of Embodiment 1. Accordingly, the same reference numerals are given to elements common to the supercooling release device 100 of Embodiment 1 and the supercooling release device 110 of the present embodiment, and descriptions thereof may be omitted. That is, the descriptions of the following embodiments can be applied to each other unless there is technical inconsistency. Further, the embodiments may be combined with each other unless there is technical inconsistency.

In the supercooling release device 110, the second member 20 is positioned between the first member 10 and the third member 30, or the first member 10 is positioned between the second member 20 and the third member 30. In FIG. 5, the first member 10, the second member 20, and the third member 30 are arranged in this order. Specifically, the third member 30 is disposed between the first shaft 41 and the second member 20. However, the third member 30 may be disposed between the first member 10 and the support portion 51. As described above, the position of the second member 20 and the position of the first member 10 may be replaced with each other. In this case, the third member 30 may be disposed between the first shaft 41 and the first member 10, or may be disposed between the second member 20 and the support portion 51.

The third member 30 is not limited to have any particular shape, and is for example plate-shaped. The following describes, as an example, a case where the third member 30 is flat plate-shaped. The third member 30 is, for example, circular in plan view. The third member 30 may be rectangular in plan view.

The third member 30 has a surface 31, for example, facing the first member 10 or the second member 20 and capable of being brought into contact with the member 10 or 20. The surface 31 is, for example, a main surface of the third member 30, and is a surface having the largest area of the third member 30. The surface 31 has, for example, at least one selected from the group consisting of a flat surface and a non-flat surface, where the non-flat surface elastically deforms upon application of a load to have an increased flatness. The surface 31 of the flat plate-shaped third member 30, for example, consists substantially of a flat surface.

The surface 31 may be capable of being brought into surface contact with the first member 10 or the second member 20. As with the first member 10 and the second member 20, the third member 30 may have, in the surface 31, no concave portion in which crystals of the heat storage material are to be housed.

The third member 30 may have a through hole 32. The through hole 32 extends in the thickness direction of the third member 30 or in the direction X. The through hole 32 is, for example, circular in plan view. The through hole 32 is positioned, for example, around the center of gravity of the surface 31 of the third member 30. The third member 30 is ring-shaped in plan view due to the through hole 32. The through hole 32, for example, overlaps at least one of the through hole 12 of the first member 10 and the through hole 22 of the second member 20. The diameter of the through hole 32 may be the same as or different from the diameter of the through hole 12 of the first member 10 or the diameter of the through hole 22 of the second member 20.

The third member 30 may be or may not be elastically deformable. The elastically deformable third member 30 can elastically deform by, for example, being compressed in the thickness direction of the third member 30. The third member 30 is, for example, a member formed from a material having elasticity according to Hooke's law.

The material of the third member 30 is, for example, a resin. That is, the third member 30 may be a resin member. Examples of the resin contained in the third member 30 include silicone, urethane, epoxy, polycarbonate, and polyphenylene sulfide. The third member 30 may contain at least one selected from the group consisting of polycarbonate and polyphenylene sulfide. The third member 30 may contain a silicone rubber.

The third member 30 may contain a metal. Examples of the metal contained in the third member 30 include copper, aluminum, iron, nickel, and titanium. The metal contained in the third member 30 may be an alloy. Examples of the alloy contained in the third member 30 include an alloy containing the above metal, stainless steel, and brass.

The elastically deformable third member 30 elastically deforms by, for example, being compressed while being in contact with the first member 10 or the second member 20. For example, in the supercooling release device 110, when the first shaft 41 is moved in the direction X, the third member 30 is sandwiched between the first shaft 41 and the second member 20 to be compressed in the thickness direction thereof. Thus, the third member 30 elastically deforms. The elastically deformed third member 30 can uniformly apply a load to the first member 10 or the second member 20. This allows the surface 21 of the second member 20 to be easily brought into close contact with the surface 11 of the first member 10. Consequently, a minute amount of the portion of the heat storage material present between the first member 10 and the second member 20 easily maintains the crystalline state. Since the crystals of the heat storage material reliably remain between the first member 10 and the second member 20, the supercooling release device 110 can release the supercooled state of the heat storage material with a higher probability.

As described above, the elastically deformable third member 30 is sandwiched between the first shaft 41 and the second member 20 to be compressed in the thickness direction thereof. By moving the first shaft 41 forward or backward in the direction X in this state, it is possible to continuously vary the load applied to the first member 10 or the second member 20. That is, by combining the first shaft 41 and the third member 30, it is possible to precisely control the load applied to the first member 10 or the second member 20. Consequently, the supercooling release device 110 can perform the operation of releasing the supercooled state of the heat storage material with precision and a high reproducibility.

The elastically deformable third member 30 can also bring the surface 21 of the second member 20 into close contact with the surface 11 of the first member 10 by a relatively small load. Reduction in load to be applied to the first member 10 or the second member 20 tends to improve durability of the members constituting the supercooling release device 110.

Modification of Embodiment 2

Figure 6A:
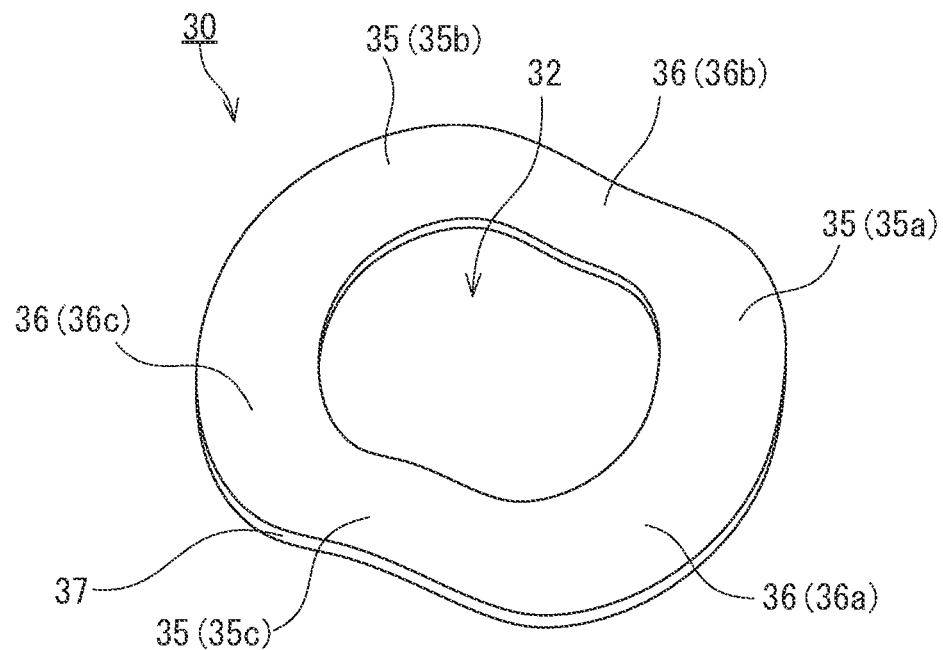
FIG. 6A is a perspective view showing a modification of a third member included in the supercooling release device shown in FIG. 4.

FIG. 6A is a perspective view showing a modification of the third member 30 included in the supercooling release device 110. The third member 30 included in the supercooling release device 110 is not limited to be flat plate-shaped, and may be corrugated plate-shaped as shown in FIG. 6A. The surface 31 of the corrugated plate-shaped third member 30 has a non-flat surface that elastically deforms upon application of a load to have an increased flatness. The surface 31 may elastically deform upon application of a load to have an increased contact area with the first member 10 or the second member 20.

As shown in FIG. 6A, the third member 30 has a plurality of ridge portions 35 and a plurality of valley portions 36. The number of the ridge portions 35 and the number of the valley portions 36 of the third member 30 are each not particularly limited, and are each, for example, 3 or more and 10 or less. In the present embodiment, the third member 30 has three ridge portions 35a, 35b, and 35c and three valley portions 36a, 36b, and 36c. The ridge portions 35a, 35b, and 35c and the valley portions 36a, 36b, and 36c are, for example, alternately arranged at equal intervals along a circumferential direction of a virtual circle defined by an outer circumferential surface 37 of the third member 30. The ridge portions 35a, 35b, and 35c may have the same height or different heights. The valley portions 36a, 36b, and 36c may have the same height or different heights.

Examples of a material of the corrugated plate-shaped third member 30 include a metal and a resin. From the viewpoint of improving the durability of the third member 30, the corrugated plate-shaped third member 30 may be made of a metal. The metal contained in the corrugated plate-shaped third member 30 is, for example, copper, aluminum, iron, nickel, or titanium. The metal contained in the corrugated plate-shaped third member 30 may be an alloy. The alloy contained in the corrugated plate-shaped third member 30 is, for example, an alloy containing the above metal, stainless steel, or brass. The corrugated plate-shaped third member 30 may contain at least one selected from the group consisting of silicone, urethane, and epoxy, or may contain silicone.

When the corrugated plate-shaped third member 30 is compressed in the thickness direction thereof, the third member 30 elastically deforms such that the heights of the ridge portions 35 and the valley portions 36 are reduced. The elastically deformed third member 30 can uniformly apply a load to the first member 10 or the second member 20 by the ridge portions 35 or the valley portions 36. The corrugated plate-shaped third member 30 has a tendency that the larger number of the ridge portions 35 and the larger number of the valley portions 36 allow a more uniform load application to the first member 10 or the second member 20. By uniformly applying a load to the first member 10 or the second member 20, the second member 20 can be easily brought into close contact with the first member 10.

Another Modification of Embodiment 2

Figure 6B:
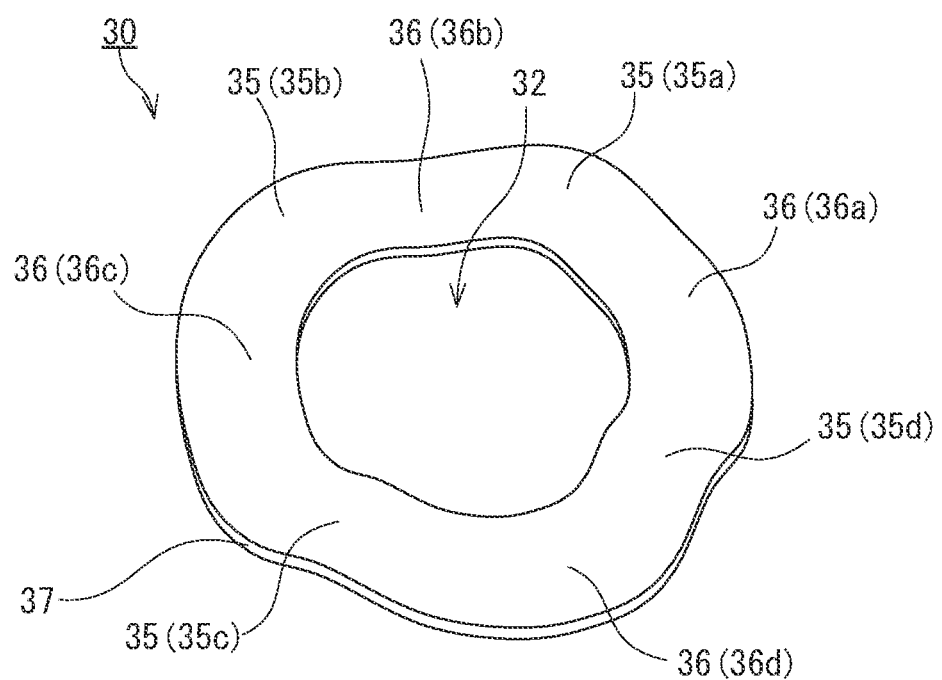
FIG. 6B is a perspective view showing another modification of the third member.

FIG. 6B is a perspective view showing another modification of the third member 30. As shown in FIG. 6B, the third member 30 has four ridge portions 35a, 35b, 35c, and 35d and four valley portions 36a, 36b, 36c, and 36d. The ridge portions 35a, 35b, 35c, and 35d and the valley portions 36a, 36b, 36c, and 36d are, for example, alternately arranged at equal intervals along the circumferential direction of the virtual circle defined by the outer circumferential surface 37 of the third member 30. The ridge portions 35a, 35b, 35c, and 35d may have the same height or different heights. The valley portions 36a, 36b, 36c, and 36d may have the same height or different heights.

Still Another Modification of Embodiment 2

Figure 6C:
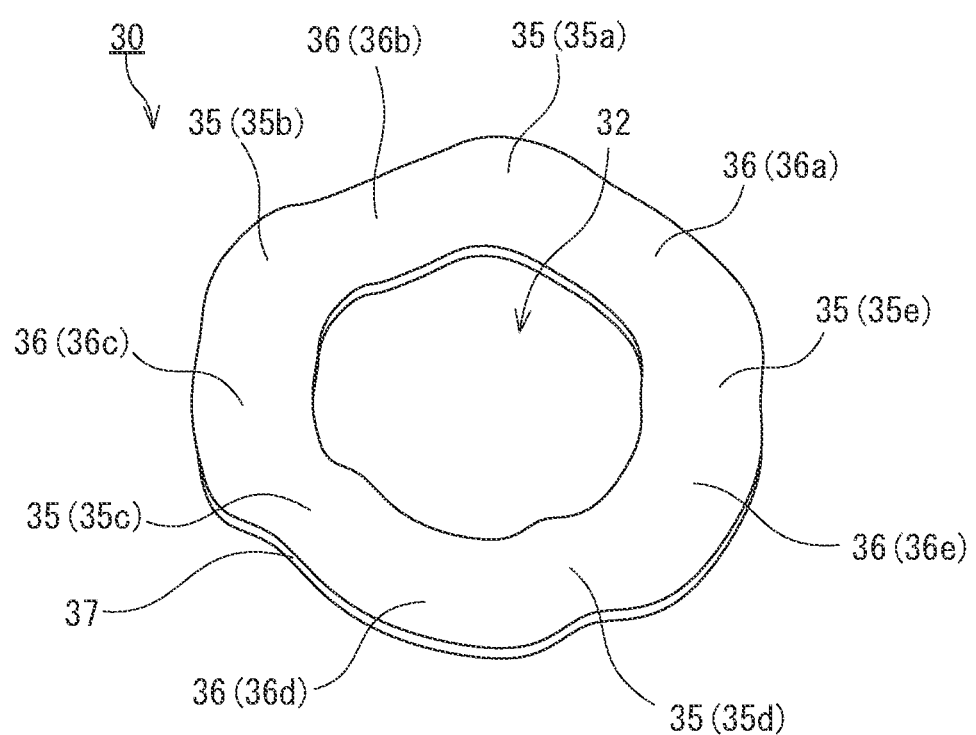
FIG. 6C is a perspective view showing still another modification of the third member.

FIG. 6C is a perspective view showing still another modification of the third member 30. As shown in FIG. 6C, the third member 30 has five ridge portions 35a, 35b, 35c, 35d, and 35e and five valley portions 36a, 36b, 36c, 36d, and 36e. The ridge portions 35a, 35b, 35c, 35d, and 35e and the valley portions 36a, 36b, 36c, 36d, and 36e are, for example, alternately arranged at equal intervals along the circumferential direction of the virtual circle defined by the outer circumferential surface 37 of the third member 30. The ridge portions 35a, 35b, 35c, 35d, and 35e may have the same height or different heights. The valley portions 36a, 36b, 36c, 36d, and 36e may have the same height or different heights.

The third member 30 is not limited to have the flat plate shape and the corrugated plate shape shown in FIGS. 5 and 6A to 6C. The third member 30 may have, for example, a shape of a spring washer as specified in JIS B1251: 2018, and may have a shape of a conical spring washer. Specific examples of the third member 30 include a ring-shaped flat plate and a wave washer that are commercially available.

Embodiment 3

Figure 7:
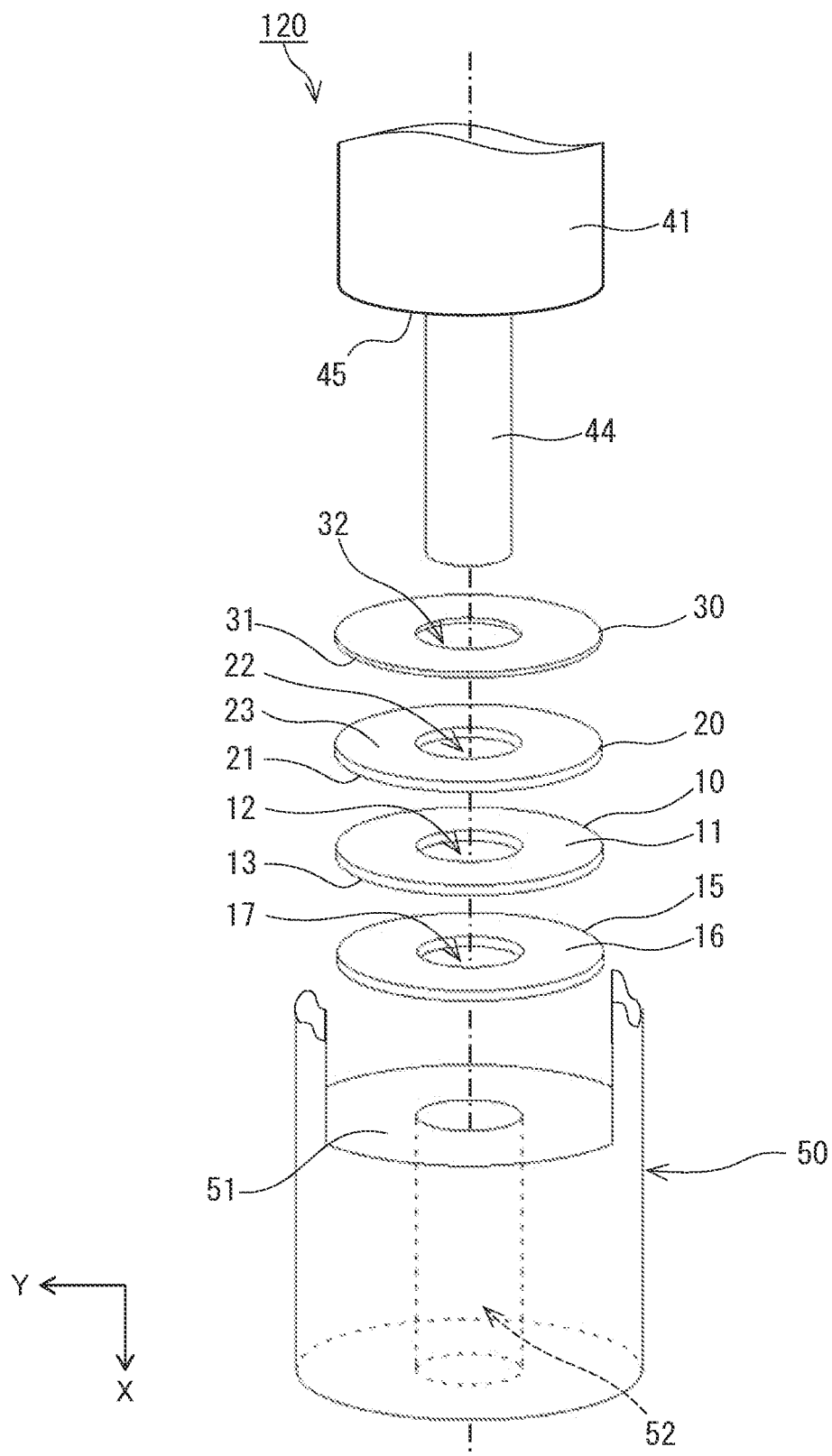
FIG. 7 is an exploded perspective view showing a portion of a supercooling release device according to Embodiment 3 of the present disclosure.

FIG. 7 is an exploded perspective view showing a portion of a supercooling release device 120 of the present Embodiment 3. As shown in FIG. 7, the supercooling release device 120 further includes a fourth member 15 in addition to the first member 10, the second member 20, and the third member 30. Except for the above, the structure of the supercooling release device 120 is the same as the structure of the supercooling release device 110 of Embodiment 2.

In the supercooling release device 120, the first member 10 and the second member 20 are positioned between the third member 30 and the fourth member 15. In FIG. 7, the fourth member 15, the first member 10, the second member 20, and the third member 30 are arranged in this order. Specifically, the fourth member 15 is disposed between the first member 10 and the support portion 51. However, the position of the fourth member 15 and the position of the third member 30 may be replaced with each other.

The fourth member 15 is not limited to have any particular shape, and is for example plate-shaped. The fourth member 15 is, for example, circular in plan view. The fourth member 15 may be rectangular in plan view. The fourth member 15 may be flat plate-shaped or corrugated plate-shaped. The corrugated plate-shaped fourth member 15 is, for example, elastically deformable. The fourth member 15 may have a shape of a spring washer as specified in JIS B1251: 2018, and may have a shape of a conical spring washer. The shape of the fourth member 15 may be the same as or different from that of the third member 30.

The fourth member 15 has a surface 16, for example, facing the first member 10 or the second member 20 and capable of being brought into contact with the member 10 or 20. The surface 16 is, for example, a main surface of the fourth member 15, and is a surface having the largest area of the fourth member 15. The surface 16 has, for example, at least one selected from the group consisting of a flat surface and a non-flat surface, where the non-flat surface elastically deforms upon application of a load to have an increased flatness. The surface 16 may elastically deform upon application of a load to have an increased contact area with the first member 10 or the second member 20.

The surface 16 may be capable of being brought into surface contact with the first member 10 or the second member 20. As with the first member 10 and the second member 20, the fourth member 15 may have, in the surface 16, no concave portion in which crystals of the heat storage material are to be housed.

The fourth member 15 may have a through hole 17. The through hole 17 extends in the thickness direction of the fourth member 15 or in the direction X. The through hole 17 is, for example, circular in plan view. The through hole 17 is positioned, for example, around the center of gravity of the surface 16 of the fourth member 15. The fourth member 15 is ring-shaped in plan view due to the through hole 17. The through hole 17, for example, overlaps at least one of the through hole 12 of the first member 10 and the through hole 22 of the second member 20. The diameter of the through hole 17 may be the same as or different from the diameter of the through hole 12 of the first member 10 or the diameter of the through hole 22 of the second member 20.

In the case where the fourth member 15 is flat plate-shaped, the fourth member 15 may be or may not be elastically deformable. The elastically deformable fourth member 15 can elastically deform by, for example, being compressed in the thickness direction of the fourth member 15. The fourth member 15 is, for example, a member formed from a material having elasticity according to Hooke's law.

Examples of the material of the fourth member 15 include a metal and a resin. Examples of the metal contained in the fourth member 15 include copper, aluminum, iron, nickel, and titanium. The metal contained in the fourth member 15 may be an alloy. Examples of the alloy contained in the fourth member 15 include an alloy containing the above metal, stainless steel, and brass. Examples of the resin contained in the fourth member 15 include silicone, urethane, epoxy, polycarbonate, and polyphenylene sulfide. The material of the fourth member 15 may be the same as or different from that of the third member 30.

Specific examples of the fourth member 15 include a ring-shaped flat plate and a wave washer that are commercially available.

The elastically deformable fourth member 15 elastically deforms by, for example, being compressed while being in contact with the first member 10 or the second member 20. For example, in the supercooling release device 120, when the first shaft 41 is moved in the direction X, the fourth member 15 is sandwiched between the support portion 51 and the first member 10 to be compressed in the thickness direction thereof. Thus, the fourth member 15 elastically deforms. The elastically deformed fourth member 15 can uniformly apply a load to the first member 10 or the second member 20. This allows the surface 21 of the second member 20 to be easily brought into close contact with the surface 11 of the first member 10. In particular, in the case where the third member 30 and the fourth member 15 are each elastically deformable, the second member 20 and the first member 10 can be more easily brought into close contact with each other. This reliably causes the crystals of the heat storage material to remain between the first member 10 and the second member 20, and consequently the supercooling release device 120 can release the supercooled state of the heat storage material with a higher probability.

As described above, the elastically deformable fourth member 15 is sandwiched between the support portion 51 and the first member 10 to be compressed in the thickness direction thereof. By moving the first shaft 41 forward or backward in the direction X in this state, it is possible to continuously vary the load applied to the first member 10 or the second member 20. That is, by combining the first shaft 41 and the fourth member 15, it is possible to precisely control the load applied to the first member 10 or the second member 20. Consequently, the supercooling release device 120 can perform the operation of releasing the supercooled state of the heat storage material with precision and a high reproducibility.

Embodiment 4

Figure 8:
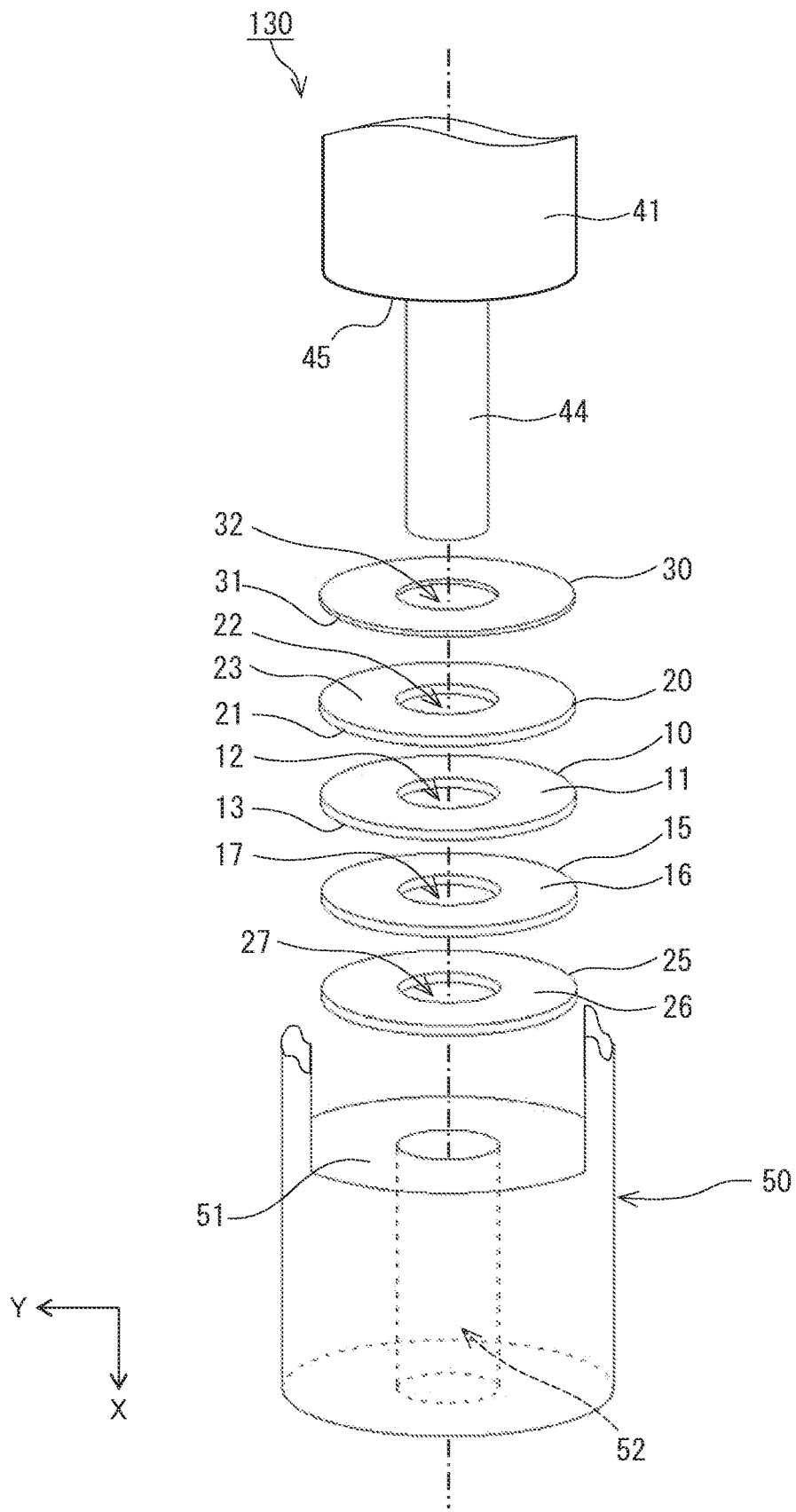
FIG. 8 is an exploded perspective view showing a portion of a supercooling release device according to Embodiment 4 of the present disclosure.

FIG. 8 is an exploded perspective view showing a portion of a supercooling release device 130 of the present Embodiment 4. As shown in FIG. 8, the supercooling release device 130 further includes a fifth member 25 in addition to the first member 10, the second member 20, the third member 30, and the fourth member 15. Except for the above, the structure of the supercooling release device 130 is the same as the structure of the supercooling release device 120 of Embodiment 3.

In the supercooling release device 130, the first member 10, the second member 20, and the fourth member 15 are positioned between the third member 30 and the fifth member 25. In FIG. 8, the fifth member 25, the fourth member 15, the first member 10, the second member 20, and the third member 30 are arranged in this order. Specifically, the fifth member 25 is disposed between the fourth member 15 and the support portion 51.

The fifth member 25 is not limited to have any particular shape, and is for example plate-shaped. The fifth member 25 is, for example, circular in plan view. The fifth member 25 may be rectangular in plan view. The fifth member 25 may be flat plate-shaped or corrugated plate-shaped. The corrugated plate-shaped fifth member 25 is, for example, elastically deformable. The fifth member 25 may have a shape of a spring washer as specified in JIS B1251: 2018, and may have a shape of a conical spring washer. The shape of the fifth member 25 may be the same as or different from that of the third member 30.

The fifth member 25 has a surface 26, for example, facing the fourth member 15 and capable of being brought into contact with the fourth member 15. The surface 26 is, for example, a main surface of the fifth member 25, and is a surface having the largest area of the fifth member 25. The surface 26 has, for example, at least one selected from the group consisting of a flat surface and a non-flat surface, where the non-flat surface elastically deforms upon application of a load to have an increased flatness. The surface 26 may elastically deform upon application of a load to have an increased contact area with the fourth member 15.

The surface 26 may be capable of being brought into surface contact with the fourth member 15. As with the first member 10 and the second member 20, the fifth member 25 may have, in the surface 26, no concave portion in which crystals of the heat storage material are to be housed.

The fifth member 25 may have a through hole 27. The through hole 27 extends in the thickness direction of the fifth member 25 or in the direction X. The through hole 27 is, for example, circular in plan view. The through hole 27 is positioned, for example, around the center of gravity of the surface 26 of the fifth member 25. The fifth member 25 is ring-shaped in plan view due to the through hole 27. The through hole 27, for example, overlaps the through hole 17 of the fourth member 15. The diameter of the through hole 27 may be the same as or different from the diameter of the through hole 17 of the fourth member 15.

In the case where the fifth member 25 is flat plate-shaped, the fifth member 25 may be or may not be elastically deformable. The elastically deformable fifth member 25 can elastically deform by, for example, being compressed in the thickness direction of the fifth member 25. The fifth member 25 is, for example, a member formed from a material having elasticity according to Hooke's law.

Examples of the material of the fifth member 25 include a metal and a resin. Examples of the metal contained in the fifth member 25 include copper, aluminum, iron, nickel, and titanium. The metal contained in the fifth member 25 may be an alloy. Examples of the alloy contained in the fifth member 25 include an alloy containing the above metal, stainless steel, and brass. Examples of the resin contained in the fifth member 25 include silicone, urethane, epoxy, polycarbonate, and polyphenylene sulfide. The material of the fifth member 25 may be the same as or different from that of the third member 30.

Specific examples of the fifth member 25 include a ring-shaped flat plate and a wave washer that are commercially available.

The elastically deformable fifth member 25 elastically deforms by, for example, being compressed while being in contact with the fourth member 15. For example, in the supercooling release device 130, when the first shaft 41 is moved in the direction X, the fifth member 25 is sandwiched between the support portion 51 and the fourth member 15 to be compressed in the thickness direction thereof. Thus, the fifth member 25 elastically deforms. The elastically deformed fifth member 25 can uniformly apply a load to the first member 10 or the second member 20 via the fourth member 15. This allows the surface 21 of the second member 20 to be easily brought into close contact with the surface 11 of the first member 10.

In the supercooling release device 130, the members that are elastically deformable and the members that are not elastically deformable may be alternately arranged in the direction X. For example, in the supercooling release device 130, the fifth member 25, the first member 10, and the third member 30 each may be elastically deformable, and the fourth member 15 and the second member 20 each may not be elastically deformable. More specifically, the fifth member 25, the first member 10, and the third member 30 each may be corrugated plate-shaped, and the fourth member 15 and the second member 20 each may be flat plate-shaped. The supercooling release device 130 having such a configuration tends to be able to release the supercooled state of the heat storage material with a higher probability.

Embodiment 5

Figure 9:
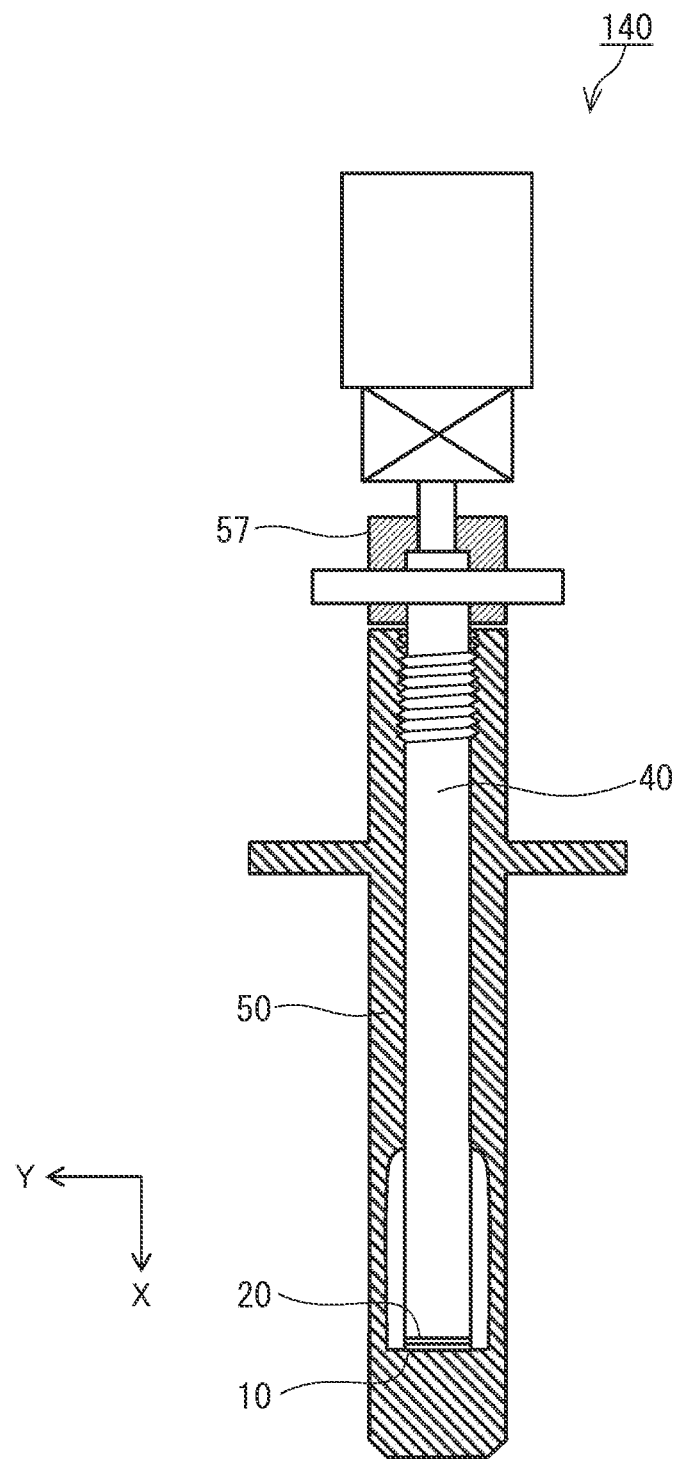
FIG. 9 is a schematic cross-sectional view of a supercooling release device according to Embodiment 5 of the present disclosure.
Figure 10:
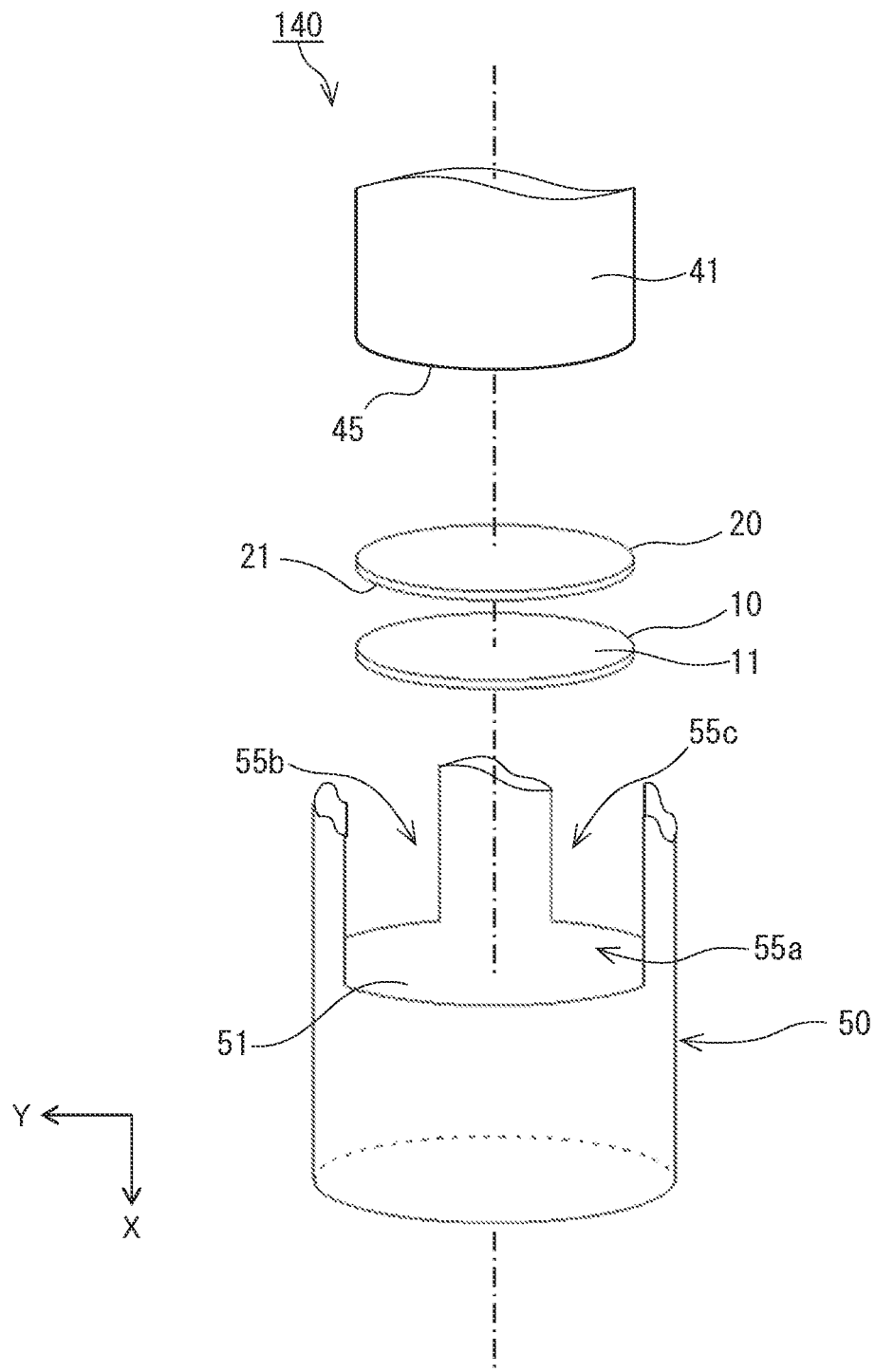
FIG. 10 is an exploded perspective view showing a portion of the supercooling release device shown in FIG. 9.

FIG. 9 is a schematic cross-sectional view of a supercooling release device 140 of the present Embodiment 5. FIG. 10 is an exploded perspective view showing a portion of the supercooling release device 140. As shown in FIGS. 9 and 10, the first member 10 and the second member 20 of the supercooling release device 140 each do not have a through hole. The load application member 40 does not have a second shaft. The body portion 56 of the cylinder 50 does not have a through hole. The body portion 56 of the cylinder 50 has three opening portions 55a, 55b, and 55c. Except for the above, the structure of the supercooling release device 140 is the same as the structure of the supercooling release device 100 of Embodiment 1.

As described above, the body portion 56 of the cylinder 50 has the three opening portions 55a, 55b, and 55c. With this structure of the body portion 56, it is possible to further inhibit the first member 10 and the second member 20 from moving from the support portion 51 and thus falling off from the body portion 56.

(Embodiment of Heat Storage Device)

Figure 11:
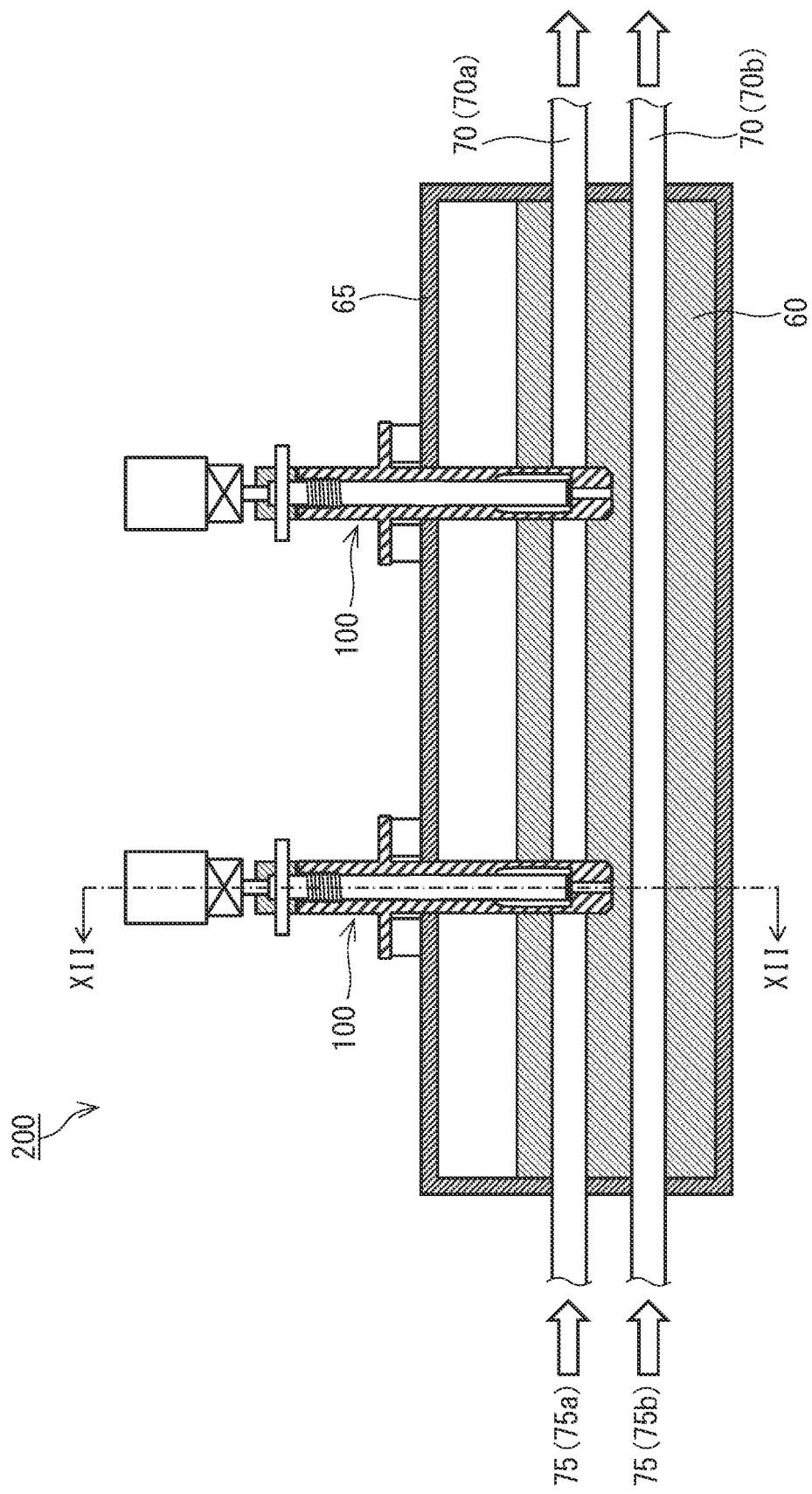
FIG. 11 is a schematic cross-sectional view of a heat storage device using the supercooling release device of the present disclosure.
Figure 12:
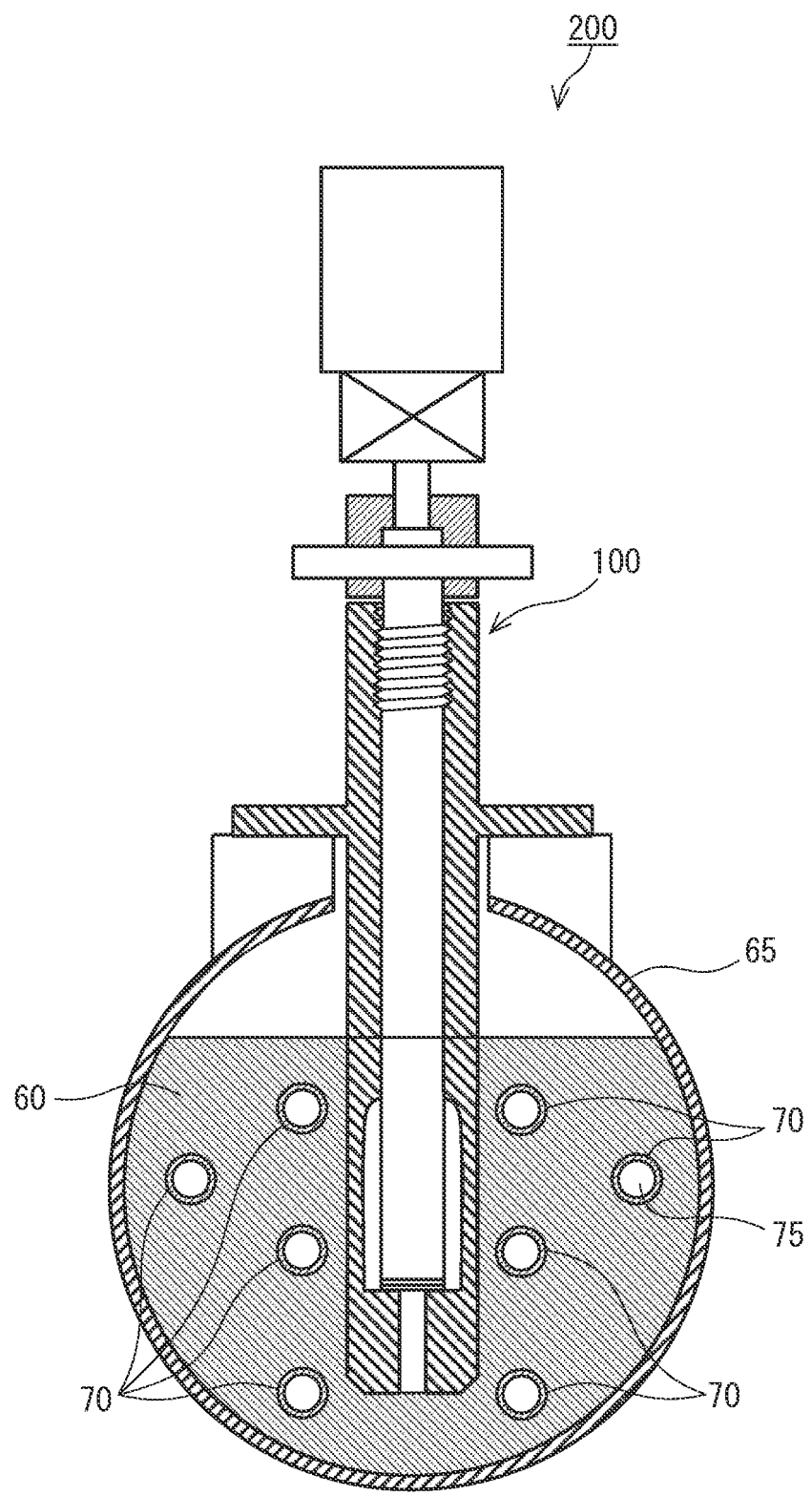
FIG. 12 is a schematic cross-sectional view taken along a line XII-XII of the heat storage device shown in FIG. 11.

FIG. 11 is a schematic cross-sectional view of a heat storage device 200 of the present embodiment. FIG. 12 is a schematic cross-sectional view taken along a line XII-XII of the heat storage device 200 shown in FIG. 11. As shown in FIG. 11, the heat storage device 200 includes the supercooling release device 100, a heat storage material 60, and a container 65. In the heat storage device 200, the supercooling release devices 110, 120, 130, and 140 can also be used, instead of the supercooling release device 100. The supercooling release device 100 is disposed so as to be in contact with the heat storage material 60. Specifically, the supercooling release device 100 is inserted into the container 65 from above the container 65. The tip portion of the supercooling release device 100 is in contact with the heat storage material 60. The supercooling release device 100 is fixed, outside the container 65, to the container 65 by the fixing portion 54 of the cylinder 50. For example, an opening is provided in each of the fixing portion 54 and the container 65, and fasteners are screwed into these openings thus to fix the supercooling release device 100 to the container 65. The number of the supercooling release devices 100 included in the heat storage device 200 is not particularly limited, and is, for example, 1 or more and 5 or less. In the present embodiment, the heat storage device 200 includes the two supercooling release devices 100.

The heat storage material 60 can be a latent heat storage material that stores heat by utilizing phase change of a material. The heat storage material 60 can store heat and release heat, for example, by phase transition between a liquid phase and a solid phase. The heat storage material 60, for example, includes at least one selected from the group consisting of a salt hydrate, a sugar alcohol, and a clathrate hydrate. The heat storage material 60 may include, as a main component, a salt hydrate, a sugar alcohol, or a clathrate hydrate.

Examples of the salt hydrate include sodium acetate trihydrate, sodium sulfate decahydrate, sodium hydrogen sulfate monohydrate, lithium chlorate trihydrate, lithium perchlorate trihydrate, potassium fluoride dihydrate, potassium fluoride tetrahydrate, calcium chloride dihydrate, calcium chloride tetrahydrate, calcium chloride hexahydrate, lithium nitrate trihydrate, sodium carbonate heptahydrate, sodium carbonate decahydrate, calcium bromide dihydrate, disodium hydrogen phosphate dihydrate, disodium hydrogen phosphate heptahydrate, disodium hydrogen phosphate dodecahydrate, iron chloride tetrahydrate, iron chloride hexahydrate, sodium thiosulfate pentahydrate, magnesium sulfate heptahydrate, lithium acetate dihydrate, sodium hydroxide monohydrate, barium hydroxide monohydrate, barium hydroxide octahydrate, ammonium aluminum sulfate hexahydrate, sodium pyrophosphate decahydrate, trisodium phosphate hexahydrate, trisodium phosphate octahydrate, and trisodium phosphate dodecahydrate.

Examples of the sugar alcohol include glycerin, xylitol, sorbitol, and erythritol. Examples of the clathrate hydrate include tetrahydrofuran clathrate hydrate, trimethylamine semiclathrate hydrate, sulfur dioxide clathrate hydrate, tetrabutylammonium formate hydrate, tetrabutylammonium acetate hydrate, tetrabutylammonium bromide (TBAB) hydrate, tetrabutylammonium chloride (TBACl) hydrate, and tetrabutylammonium fluoride (TBAF) hydrate.

The heat storage material 60 may further contain an additive such as a stabilizer, water, and the like, in addition to the salt hydrate, the sugar alcohol, or the clathrate hydrate.

The container 65 houses the heat storage material 60. As shown in FIGS. 11 and 12, the container 65 is, for example, columnar. The container 65 may be elliptic columnar or rectangular columnar. The ratio of the volume of the heat storage material 60 to the volume of the container 65 is not particularly limited, and is, for example, 60 vol % or more and 95 vol % or less. The material of the container 65 is not particularly limited, and is, for example, a metal or a resin. Examples of the metal include copper and aluminum. The metal may be an alloy. Examples of the alloy include an alloy including the above metal and stainless steel. Examples of the resin include polyphenylene sulfide and polyether ether ketone.

As shown in FIGS. 11 and 12, the heat storage device 200 further includes a pipe 70. The pipe 70 is in contact with the heat storage material 60 inside the container 65. The pipe 70, for example, extends in a direction from one of a pair of edge faces of the container 65 to the other edge face to penetrate the container 65. The pipe 70 is a flow path for a heat medium 75. The pipe 70 functions as a partition separating the heat storage material 60 and the heat medium 75 from each other. The pipe 70 is formed from a material having heat transfer properties.

The heat medium 75 imparts heat to the heat storage material 60 or recovers heat from the heat storage material 60. Examples of the heat medium 75 include water, an antifreeze solution, and an oil. The antifreeze solution is, for example, an ethylene glycol aqueous solution. The oil may be a lubricating oil. According to the heat medium 75, heat recovered from the heat storage material 60 can be used outside the container 65.

The heat storage device 200 may include a plurality of the pipes 70. The number of the pipes 70 is not particularly limited, and is, for example, 1 or more and 100 or less. As shown in FIG. 12, in the present embodiment, the heat storage device 200 includes the eight pipes 70.

In the case where the heat storage device 200 includes the pipes 70, the heat medium 75 flowing through each of the pipes 70 may be the same or different from each other. For example, in FIG. 11, a heat medium 75a flowing through a pipe 70a may be an antifreeze solution and a heat medium 75b flowing through a pipe 70b may be oil.

(Embodiment of Power Device)

Figure 13:
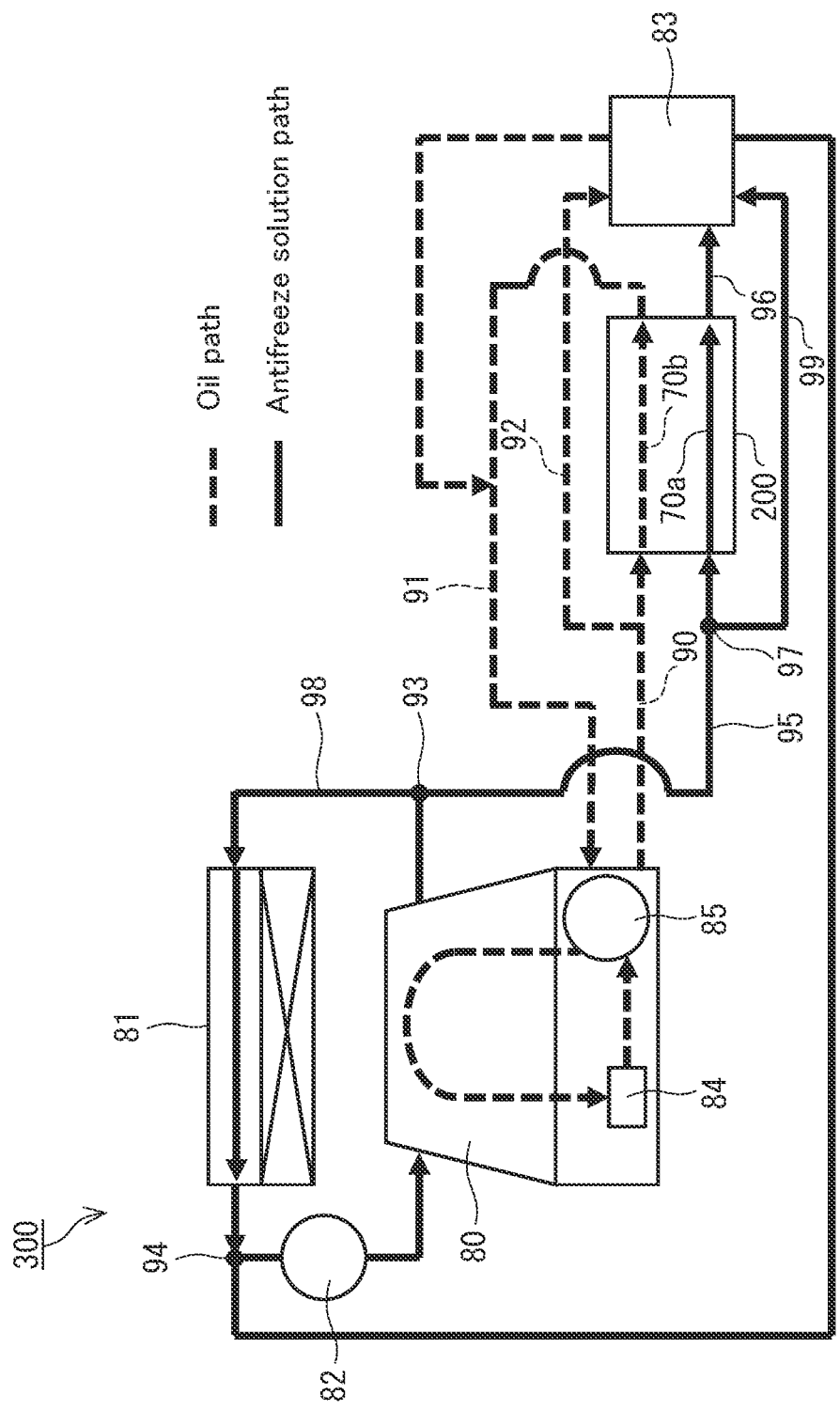
FIG. 13 is a schematic configuration diagram of a power device using the heat storage device of the present disclosure.

FIG. 13 is a schematic configuration diagram of a power device 300 of the present embodiment. As shown in FIG. 13, the power device 300 includes the heat storage device 200 and a powertrain 80. The heat storage device 200 includes the pipes 70a and 70b. An antifreeze solution flows through the pipe 70a. An oil flows through the pipe 70b. The powertrain 80 is for example an internal combustion engine. Examples of the internal combustion engine include a gasoline engine, a diesel engine, a steam engine, and an electric motor. Inside the powertrain 80, an oil and an antifreeze solution circulate. The power device 300 is for example a vehicle such as an automobile or a two-wheeled vehicle. Examples of the automobile include a gasoline automobile, a diesel automobile, and an electric automobile.

The powertrain 80 has an oil pan 84 and a pump 85. The oil pan 84 houses the oil. The pump 85 increases the pressure of the oil circulating through the powertrain 80 to adjust the flow rate of the oil.

The power device 300 further includes an oil discharge path 90. The oil discharge path 90 is a path for sending the oil discharged from the powertrain 80 to the heat storage device 200. The oil discharge path 90 has one end connected to an oil outlet of the powertrain 80 and the other end connected to an inlet of the pipe 70b of the heat storage device 200.

The power device 300 further includes an oil supply path 91. The oil supply path 91 is a path for supplying the oil to the powertrain 80. The oil supply path 91 has one end connected to an outlet of the pipe 70b of the heat storage device 200 and the other end connected to an oil inlet of the powertrain 80.

The power device 300 further includes a bypass path 92. The bypass path 92 branches from the oil discharge path 90. The bypass path 92 is connected to the oil supply path 91. On the bypass path 92, a heat exchanger 83 is disposed. The heat exchanger 83 is a liquid-liquid heat exchanger generating heat exchange between the oil flowing through the bypass path 92 and the antifreeze solution flowing through an antifreeze solution supply path 96 described later. A specific example of the heat exchanger 83 is a plate type heat exchanger.

The power device 300 further includes an antifreeze solution discharge path 95. The antifreeze solution discharge path 95 is a path for sending the antifreeze solution discharged from the powertrain 80 to the heat storage device 200. The antifreeze solution discharge path 95 has one end connected to an antifreeze solution outlet of the powertrain 80 and the other end connected to an inlet of the pipe 70a of the heat storage device 200.

The power device 300 further includes the antifreeze solution supply path 96. The antifreeze solution supply path 96 is a path for supplying the antifreeze solution to the powertrain 80. The antifreeze solution supply path 96 has one end connected to an outlet of the pipe 70a of the heat storage device 200 and the other end connected to an antifreeze solution inlet of the powertrain 80. On the antifreeze solution supply path 96, the heat exchanger 83 and a pump 82 are disposed. The pump 82 increases the pressure of the antifreeze solution flowing through the antifreeze solution supply path 96 to adjust the flow rate of the antifreeze solution.

The power device 300 further includes bypass paths 98 and 99. The bypass path 98 extends from a branch point 93 to a branch point 94. The branch point 93 is positioned on the antifreeze solution discharge path 95. The branch point 94 is positioned between the heat exchanger 83 and the pump 82 on the antifreeze solution supply path 96. On the bypass path 98, a radiator 81 is disposed. The radiator 81 cools the antifreeze solution flowing through the bypass path 98.

The bypass path 99 extends from a branch point 97 to the heat exchanger 83. The branch point 97 is positioned between the branch point 93 and the heat storage device 200 on the antifreeze solution discharge path 95. The bypass path 99 joins the antifreeze solution supply path 96 in the heat exchanger 83.

While the powertrain 80 is operated, the temperature of the powertrain 80 increases. Accordingly, the temperatures of the antifreeze solution and the oil circulating through the powertrain 80 increase, too. The antifreeze solution circulating through the powertrain 80 is partially discharged from the powertrain 80 through the antifreeze solution discharge path 95. The antifreeze solution flowing through the antifreeze solution discharge path 95 is sent to the heat storage device 200. The antifreeze solution flowing through the pipe 70a of the heat storage device 200 applies heat to the heat storage material 60 of the heat storage device 200. Thus, the heat storage material 60 can be heated. The antifreeze solution discharged from the heat storage device 200 is supplied to the powertrain 80 through the antifreeze solution supply path 96.

The antifreeze solution discharged from the powertrain 80 may be sent to the bypass path 98 or 99. The antifreeze solution sent to the bypass path 98 is cooled by the radiator 81. The cooled antifreeze solution is supplied to the powertrain 80 through the antifreeze solution supply path 96.

The oil circulating through the powertrain 80 is partially discharged from the powertrain 80 through the oil discharge path 90. The oil flowing through the oil discharge path 90 is sent to the heat exchanger 83 through the bypass path 92. In the heat exchanger 83, the temperature of the oil is higher than the temperature of the antifreeze solution. Thus, the oil is cooled by heat exchange between the oil and the antifreeze solution in the heat exchanger 83. The oil cooled in the heat exchanger 83 is supplied to the powertrain 80 through the oil supply path 91.

When the operation of the powertrain 80 is stopped, the temperatures of the oil and the antifreeze solution decrease together with the temperature of the powertrain 80. Further, the temperature of the heat storage material 60 also decreases. The temperature of the heat storage material 60 falls below the melting point of the heat storage material 60, and thus the heat storage material 60 is supercooled.

When the operation of the powertrain 80 is restarted, the supercooled state of the heat storage material 60 is released by an operation of the supercooling release device 100 of the heat storage device 200. Thus, the heat storage material 60 releases heat. The antifreeze solution flowing through the pipe 70a and the oil flowing through the pipe 70b recover the heat released from the heat storage material 60. The heated antifreeze solution is supplied to the powertrain 80 through the antifreeze solution supply path 96. The heated oil is supplied to the powertrain 80 through the oil supply path 91. Thus, the powertrain 80 can receive the heat released from the heat storage device 200. According to the power device 300, the powertrain 80 can be efficiently heated. This allows time reduction in a warm-up operation of the powertrain 80. Fuel consumption or electric power consumption during the warm-up operation can be reduced. In particular, according to the power device 300 of the present embodiment, fuel consumption or electric power consumption during the warm-up operation can be greatly reduced in a cold district where the temperature of the external environment is lower than −20° C.

EXAMPLES

The present disclosure will be specifically described based on examples. However, the present disclosure is not limited in any way by the following examples.

Example 1

In Example 1, a supercooling release device including the first to third members, the load application member, and the cylinder was prepared. In the supercooling release device of Example 1, the first member was ring-shaped in plan view. The first member had an outer diameter of 7 mm and an inner diameter of 3.2 mm. The first member had a thickness of 0.5 mm. The first member was a ring-shaped flat stainless steel (SUS) plate. The second member had the same shape as the first member. The second member was a ring-shaped flat SUS plate. The third member was corrugated plate-shaped. The third member had the same shape as that shown in FIG. 6A. The third member had an outer diameter of 7 mm and an inner diameter of 3.2 mm. The third member was a SUS wave washer. The load application member and the cylinder had the same shapes as the load application member and the cylinder, respectively, shown in FIG. 1. The arrangement of the first to third members, the load application member, and the cylinder was the same as that shown in FIG. 4.

Examples 2 to 8

Supercooling release devices of Examples 2 to 8 were prepared in the same manner as in Example 1 except that the material, shape, and arrangement of the first to third members were modified as shown in Table 1.

Example 9

A supercooling release device of Example 9 was prepared in the same manner as in Example 1 except that the fourth member was added to the supercooling release device and that the first to fourth members were arranged as shown in Table 2. In Example 9, the fourth member was a SUS wave washer having the same shape as the third member.

Example 10

A supercooling release device of Example 10 was prepared in the same manner as in Example 6 except that the fourth member and the fifth member were added to the supercooling release device and the first to fifth members were arranged as shown in Table 2. In Example 10, the fourth member was a ring-shaped flat SUS plate having the same shape as the second member, and the fifth member was a SUS wave washer having the same shape as the third member.

Comparative Examples 1 to 4

Supercooling release devices of Comparative Examples 1 to 4 were prepared in the same manner as in Example 1 except that the material, shape, and arrangement of the first to third members were modified as shown in Table 3.

[Preparation of Supercooling Release Test]

Preparation of a supercooling release test was performed by the following method with respect to each of the supercooling release devices of Examples 1 to 10 and Comparative Examples 1 to 4. First, 52.3 g of a heat storage material was added into a 60 mL vial. The heat storage material contained sodium acetate trihydrate as a main component. Next, the vial was heated in a thermostatic chamber set at 75° C. to completely melt the heat storage material. Next, the heat storage material was cooled using the thermostatic chamber set at 20° C. Thus, the heat storage material in a supercooled state was obtained.

Next, seed crystals of sodium acetate trihydrate were adhered in advance to a portion of the supercooling release device that is to be brought into contact with the heat storage material. Next, a tip portion of the supercooling release device was inserted into an opening portion of the vial. After the supercooling release device was inserted in the vial, the vial was sealed. By bringing the tip portion of the supercooling release device into contact with the heat storage material in the supercooled state, crystallization of the heat storage material was caused to proceed. As a result, crystals of the heat storage material were housed between the first member and the second member. Next, the first shaft of the load application member was rotated clockwise thus to move the first shaft in the direction from the second member to the first member. This applied a load to the second member in the direction from the second member to the first member, so that the first member and the second member were brought into close contact with each other. Through the above operation, the preparation of the supercooling release test was completed.

[Supercooling Release Test]

Next, the supercooling release test was performed by the following method on the supercooling release device. First, the vial was heated for one hour in the thermostatic chamber set at 90° C. Next, the heat storage material was cooled using the thermostatic chamber set at 20° C. Thus, the heat storage material in a supercooled state was obtained. Next, the first shaft of the load application member of the supercooling release device was rotated counterclockwise thus to move the first shaft in the direction from the first member to the second member. This reduced the load applied to the second member to cause the second member to displace relative to the first member. At this time, whether crystallization of the heat storage material proceeded was checked.

In the case where the supercooled state of the heat storage material was released and thus crystallization of the heat storage material proceeded, the first shaft of the load application member was moved again in the direction from the second member to the first member. This applied a load to the second member in the direction from the second member to the first member, so that the first member and the second member were brought into close contact with each other. Next, the supercooling release test was repeated by the method described above.

In the case where the supercooled state of the heat storage material was not released and thus crystallization of the heat storage material did not proceed, the supercooling release device was removed from the vial. Next, the heat storage material adhering to the supercooling release device was crystallized using crystals of sodium acetate trihydrate. The supercooling release device was reinserted into the vial, and the vial was sealed. By bringing the tip portion of the supercooling release device into contact with the heat storage material in the supercooled state, crystallization of the heat storage material was caused to proceed. Next, the first shaft of the load application member was moved in the direction from the second member to the first member. This applied a load to the second member in the direction from the second member to the first member, so that the first member and the second member were brought into close contact with each other. Next, the supercooling release test was repeated by the method described above.

Through the above operation, the supercooling release test was repeated multiple times. Based on obtained results, a supercooling release ratio was calculated. The supercooling release ratio means the ratio of the number of times the supercooled state of the heat storage material was released to the number of times of the tests.

TABLE 1

|  |  | Example 1 | Example 2 | Example 3 | Example 4 | Example 5 | Example 6 | Example 7 | Example 8 |
|---|---|---|---|---|---|---|---|---|---|
| Configuration | Third member | SUS wave washer | — | — | — | Ring-shaped flat SUS plate | SUS wave washer | — | SUS wave washer |
|  | Second member | Ring-shaped flat SUS plate | Ring-shaped flat SUS plate | SUS wave washer | SUS wave washer | SUS wave washer | Ring-shaped flat SUS plate | Ring-shaped flat Cu plate | Ring-shaped flat Cu plate |
|  | First member | Ring-shaped flat SUS plate | Ring-shaped flat SUS plate | Ring-shaped flat SUS plate | Ring-shaped flat SUS plate | Ring-shaped flat SUS plate | SUS wave washer | Ring-shaped flat Cu plate | Ring-shaped flat Cu plate |
|  | Third member | — | — | Ring-shaped flat PC plate | Ring-shaped flat PPS plate | — | — | — | — |
| Number of times of tests (time) |  | 18 | 9 | 4 | 6 | 9 | 9 | 9 | 22 |
| Release ratio (%) |  | 100 | 88.8 | 100 | 83.3 | 88.8 | 88.8 | 66.6 | 100 |

In Table 1, "PC" stands for polycarbonate, "PPS" stands for polyphenylene sulfide, and "Cu" represents brass. The "ring-shaped flat PC plate" and the "ring-shaped flat PPS plate", and the "ring-shaped flat Cu plate" of Example 7 had the same shape as the ring-shaped flat SUS plate of Example 1. The "ring-shaped flat Cu plate" of Example 8 had an outer diameter of 7 mm, an inner diameter of 3.2 mm, and a thickness of 0.1 mm.

TABLE 2

|  |  | Example 9 | Example 10 |
|---|---|---|---|
| Configuration | Third member | SUS wave washer | SUS wave washer |
|  | Second member | Ring-shaped flat SUS plate | Ring-shaped flat SUS plate |
|  | First member | Ring-shaped flat SUS plate | SUS wave washer |
|  | Fourth member | SUS wave washer | Ring-shaped flat SUS plate |

TABLE 2-continued

|  |  | Example 9 | Example 10 |
|---|---|---|---|
|  | Fifth member | — | SUS wave washer |
| Number of times of tests (time) |  | 18 | 23 |
| Release ratio (%) |  | 100 | 100 |

TABLE 3

|  |  | Comparative Example 1 | Comparative Example 2 | Comparative Example 3 | Comparative Example 4 |
|---|---|---|---|---|---|
| Configuration | Third member | SUS wave washer | SUS wave washer | SUS wave washer | SUS wave washer |
|  | Second member | Ring-shaped flat PC plate | Ring-shaped flat PPS plate | Ring-shaped flat PC plate | Ring-shaped flat PPS plate |
|  | First member | Ring-shaped flat PC plate | Ring-shaped flat PPS plate | Ring-shaped flat SUS plate | Ring-shaped flat SUS plate |
| Number of times of tests (time) |  | 3 | 6 | 3 | 6 |
| Release ratio (%) |  | 0 | 0 | 0 | 0 |

As can be seen from Tables 1 to 3, the supercooling release devices of the examples, in which the first member and the second member each contained a metal, exhibited a high supercooling release ratio. On the other hand, the supercooling release devices of the comparative examples, in which at least the second member contained no metal, were not able to release the supercooled state of the heat storage material.

Measurement Examples 1 to 5

Next, the conditions for the supercooling release test were examined using the supercooling release device of Example 1. Specifically, the supercooling release test was performed for Measurement Examples 1 to 5 by the same method described above except that the reduction ratio P of the load in the second member at the release of the supercooled state of the heat storage material was modified as shown in Table 4. The load reduction ratio P means the ratio of the load reduction amount D (MPa) to the load L (MPa) applied to the second member in the preparation phase of the supercooling release device. The conditions in Measurement Example 1 are the same as those in the supercooling release test described above. In Measurement Example 2, the load L applied to the second member in the preparation phase of the supercooling release device was set to a higher value than that in Measurement Example 1.

TABLE 4

|  |  | Measurement Example 1 | Measurement Example 2 | Measurement Example 3 | Measurement Example 4 | Measurement Example 5 |
|---|---|---|---|---|---|---|
| Configuration | Third member | SUS wave washer | | | | |
|  | Second member | Ring-shaped flat SUS plate | | | | |
|  | First member | Ring-shaped flat SUS plate | | | | |
| Load reduction ratio P (%) |  | 100 | 100 | 41.28 | 68.52 | 79.61 |
| Number of times of tests (time) |  | 18 | 15 | 10 | 12 | 7 |
| Release ratio (%) |  | 100 | 100 | 100 | 100 | 100 |

As can be seen from Table 4, the supercooling release device of Example 1 exhibited a high supercooling release ratio even under the modified conditions for the supercooling release test.

INDUSTRIAL APPLICABILITY

The supercooling release device of the present disclosure can, at a desired time, release a supercooled state of a heat storage material to cause the heat storage material to release heat. The heat storage device of the present disclosure is suitable for warming up apparatuses by using waste heat of an internal combustion engine, waste heat of a combustion boiler, and the like as a heat source. According to the power device of the present disclosure, energy resources can be effectively utilized. The techniques disclosed herein are also applicable to gasoline automobiles, air conditioners, water heaters, cooling systems for electric vehicles (EVs), and residential floor heating systems.

The invention claimed is:
1. A supercooling release device that releases a supercooled state of a heat storage material, the supercooling release device comprising:
    a first member and a second member capable of being brought into contact with each other; and
    a guide member configured to control displacement of the first member and the second member in a direction orthogonal to a direction in which the load is applied,
    wherein:
    the first member and the second member each include a metal,
    the guide member includes a cylinder,
    the cylinder houses the first member and the second member in an opening portion,
    the cylinder includes a through hole, through which the heat storage material enters into the opening portion, while a load is continuously applied to at least one of the first member and the second member to bring at least a portion of a surface of the first member and at least a portion of a surface of the second member into contact with each other, the supercooled state of the heat storage material is maintained such that the heat storage material is maintained in a liquid phase at a temperature below a melting point of the heat storage material, and when the supercooled state is to be released to solidify the heat storage material, the load is reduced.

2. The supercooling release device according to claim 1, wherein
the first member and the second member are each plate-shaped.

3. The supercooling release device according to claim 2, wherein
the first member and the second member have, as the surfaces that are in contact with each other while the load is applied, surfaces that are each at least one selected from the group consisting of a flat surface and a non-flat surface, the non-flat surface elastically deforming upon application of the load to have an increased contact area.

4. The supercooling release device according to claim 1, wherein:
the guide member further includes a shaft, and
the shaft is inserted into a through hole formed in the first member and a through hole formed in the second member.

5. The supercooling release device according to claim 1, further comprising
a third member, wherein
the second member is positioned between the first member and the third member, or the first member is positioned between the second member and the third member, and
the third member has at least one selected from the group consisting of a flat surface and a non-flat surface, the non-flat surface elastically deforming upon application of the load to have an increased flatness.

6. The supercooling release device according to claim 1, further comprising
a third member, wherein
the second member is positioned between the first member and the third member, or the first member is positioned between the second member and the third member, and
the third member is a resin member.

7. The supercooling release device according to claim 5, further comprising
a fourth member, wherein
the first member and the second member are positioned between the third member and the fourth member, and
the fourth member has at least one selected from the group consisting of a flat surface and a non-flat surface, the non-flat surface elastically deforming upon application of the load to have an increased flatness.

8. The supercooling release device according to claim 1, wherein
the first member and the second member have, as the surfaces that are in contact with each other while the load is applied, flat surfaces.

9. The supercooling release device according to claim 1, wherein
the metal has a thermal conductivity of less than 225 W/m·K at 25° C.

10. The supercooling release device according to claim 1, wherein
when the supercooled state is to be released, the load is reduced to displace the first member and the second member relative to each other such that the heat storage material in the supercooled state enters between the first member and the second member.

11. The supercooling release device according to claim 1, wherein
the first member and the second member have, in the surfaces that are in contact with each other while the load is applied, no concave portion in which a crystal of the heat storage material is to be housed.

12. The supercooling release device according to claim 1, further comprising
a piston configured to apply a load to at least one of the first member and the second member.

13. A heat storage device comprising:
a supercooling release device;
a heat storage material including at least one selected from the group consisting of a salt hydrate, a sugar alcohol, and a clathrate hydrate; and
a container housing the heat storage material, wherein:
the supercooling release device comprises:
a first member and a second member capable of being brought into contact with each other; and
a guide member configured to control displacement of the first member and the second member in a direction orthogonal to a direction in which the load is applied,
the first member and the second member each include a metal,
the guide member includes a cylinder,
the cylinder houses the first member and the second member in an opening portion,
the cylinder includes a through hole, through which the heat storage material enters into the opening portion,
the supercooling release device is attached to the container so that the through hole of the cylinder contacts the heat storage material,
while a load is continuously applied to at least one of the first member and the second member to bring at least a portion of a surface of the first member and at least a portion of a surface of the second member into contact with each other, the supercooled state of the heat storage material is maintained such that the heat storage material is maintained in a liquid phase at a temperature below a melting point of the heat storage material, and
when the supercooled state is to be released to solidify the heat storage material, the load is reduced.

14. A power device comprising:
the heat storage device according to claim 13; and
a powertrain configured to receive heat released from the heat storage device.

15. A supercooling release device that releases a supercooled state of a heat storage material, the supercooling release device comprising:
a first member and a second member capable of being brought into contact with each other;
a guide member configured to control displacement of the first member and the second member in a direction orthogonal to a direction in which the load is applied; and
a load application member configured to apply, to at least one of the first member and the second member, a load for bringing at least a portion of a surface of the first member and at least a portion of a surface of the second member into contact with each other, wherein:

the guide member includes a cylinder, the cylinder houses the first member and the second member in an opening portion, the cylinder includes a through hole, through which the heat storage material enters into the opening portion, the load application member is configured to continuously apply the load to maintain the supercooled state of the heat storage material such that the heat storage material is maintained in a liquid phase at a temperature below a melting point of the heat storage material, and the load application member is configured to reduce the load to release the supercooled state to solidify the heat storage material, and the first member and the second member each include a metal, and are each plate-shaped.

16. The supercooling release device according to claim 15, wherein the guide member further includes a shaft, and the shaft is inserted into a through hole formed in the first member and a through hole formed in the second member.

17. The supercooling release device according to claim 15, wherein the first member and the second member are each plate-shaped.

18. The supercooling release device according to claim 17, wherein the first member and the second member have, as the surfaces that are in contact with each other while the load is applied, surfaces that are each at least one selected from the group consisting of a flat surface and a non-flat surface, the non-flat surface elastically deforming upon application of the load to have an increased contact area.

19. The supercooling release device according to claim 15, wherein:

the guide member further includes a shaft, and the shaft is inserted into a through hole formed in the first member and a through hole formed in the second member.

20. The supercooling release device according to claim 15, further comprising a third member, wherein:

the second member is positioned between the first member and the third member, or the first member is positioned between the second member and the third member, and the third member has at least one selected from the group consisting of a flat surface and a non-flat surface, the non-flat surface elastically deforming upon application of the load to have an increased flatness.

* * * * *